US008226836B2

(12) United States Patent
Chui et al.

(10) Patent No.: US 8,226,836 B2
(45) Date of Patent: Jul. 24, 2012

(54) MIRROR AND MIRROR LAYER FOR OPTICAL MODULATOR AND METHOD

(75) Inventors: Clarence Chui, San Jose, CA (US); Jeffrey B. Sampsell, Pueblo West, CO (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 520 days.

(21) Appl. No.: 12/190,520

(22) Filed: Aug. 12, 2008

(65) Prior Publication Data

US 2008/0314866 A1 Dec. 25, 2008

Related U.S. Application Data

(62) Division of application No. 11/173,551, filed on Jul. 1, 2005, now Pat. No. 7,417,783.

(60) Provisional application No. 60/613,538, filed on Sep. 27, 2004.

(51) Int. Cl.
*B29D 11/00* (2006.01)
*C23F 1/00* (2006.01)
*H01L 27/148* (2006.01)

(52) U.S. Cl. .................. 216/24; 216/2; 216/11; 216/37; 216/41; 216/56; 438/48; 438/50; 438/222; 438/389; 438/638; 257/414; 257/415; 257/416

(58) Field of Classification Search ............... 216/2, 11, 216/24, 37, 41, 56, 58; 438/48, 50, 52, 222, 438/389, 648; 257/414, 415, 416
See application file for complete search history.

(56) References Cited

U.S. PATENT DOCUMENTS

| 3,728,030 A | 4/1973 | Hawes |
| 3,955,880 A | 5/1976 | Lierke |
| 4,377,324 A | 3/1983 | Durand et al. |
| 4,482,213 A | 11/1984 | Piliavin et al. |
| 4,519,676 A | 5/1985 | te Velde |
| 4,786,128 A | 11/1988 | Birnbach |
| 4,790,635 A | 12/1988 | Apsley |
| 4,900,136 A | 2/1990 | Goldburt et al. |
| 4,965,562 A | 10/1990 | Verhulst |
| 5,022,745 A | 6/1991 | Zayhowski et al. |
| 5,044,736 A | 9/1991 | Jaskie et al. |
| 5,075,796 A | 12/1991 | Schildkraut et al. |

(Continued)

FOREIGN PATENT DOCUMENTS

CH 680534 9/1992

(Continued)

OTHER PUBLICATIONS

Search Report dated Sep. 29, 2010 for Taiwanese Patent Application No. 094130432, filed Sep. 5, 2005.

(Continued)

*Primary Examiner* — Nadine G Norton
*Assistant Examiner* — Christopher Remavege
(74) *Attorney, Agent, or Firm* — Knobbe, Martens, Olson & Bear LLP

(57) ABSTRACT

Described herein are systems, devices, and methods relating to packaging electronic devices, for example, microelectromechanical systems (MEMS) devices, including optical modulators such as interferometric optical modulators. The interferometric modulator disclosed herein comprises a movable mirror. Some embodiments of the disclosed movable mirror exhibit a combination of improved properties compared to known mirrors, including reduced moving mass, improved mechanical properties, and reduced etch times.

23 Claims, 36 Drawing Sheets

U.S. PATENT DOCUMENTS

| | | |
|---|---|---|
| 5,099,353 A | 3/1992 | Hornbeck |
| 5,124,834 A | 6/1992 | Cusano et al. |
| 5,168,406 A | 12/1992 | Nelson |
| 5,172,262 A | 12/1992 | Hornbeck |
| 5,192,395 A | 3/1993 | Boysel et al. |
| 5,212,582 A | 5/1993 | Nelson |
| 5,226,099 A | 7/1993 | Mignardi et al. |
| 5,231,532 A | 7/1993 | Magel et al. |
| 5,293,272 A | 3/1994 | Jannson et al. |
| 5,311,360 A | 5/1994 | Bloom et al. |
| 5,312,512 A | 5/1994 | Allman et al. |
| 5,345,328 A | 9/1994 | Fritz et al. |
| 5,347,377 A | 9/1994 | Revelli, Jr. et al. |
| 5,381,232 A | 1/1995 | van Wijk |
| 5,452,138 A | 9/1995 | Mignardi et al. |
| 5,489,952 A | 2/1996 | Gove et al. |
| 5,500,761 A | 3/1996 | Goossen et al. |
| 5,535,047 A | 7/1996 | Hornbeck |
| 5,552,924 A | 9/1996 | Tregilgas |
| 5,559,358 A | 9/1996 | Burns et al. |
| 5,578,976 A | 11/1996 | Yao |
| 5,608,468 A | 3/1997 | Gove et al. |
| 5,619,059 A | 4/1997 | Li et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,638,946 A | 6/1997 | Zavracky |
| 5,690,839 A | 11/1997 | Min |
| 5,699,181 A | 12/1997 | Choi |
| 5,710,656 A | 1/1998 | Goossen |
| 5,739,945 A | 4/1998 | Tayebati |
| 5,745,281 A | 4/1998 | Yi et al. |
| 5,771,321 A | 6/1998 | Stern |
| 5,784,189 A | 7/1998 | Bozler et al. |
| 5,822,110 A | 10/1998 | Dabbaj |
| 5,825,528 A | 10/1998 | Goossen |
| 5,835,255 A | 11/1998 | Miles |
| 5,867,302 A | 2/1999 | Fleming et al. |
| 5,914,803 A | 6/1999 | Hwang et al. |
| 5,914,804 A | 6/1999 | Goossen |
| 5,920,421 A | 7/1999 | Choi |
| 5,943,155 A | 8/1999 | Goossen |
| 5,943,158 A | 8/1999 | Ford et al. |
| 5,959,763 A | 9/1999 | Bozler et al. |
| 5,972,193 A | 10/1999 | Chou et al. |
| 5,978,127 A | 11/1999 | Berg |
| 5,986,796 A | 11/1999 | Miles |
| 6,028,690 A | 2/2000 | Carter et al. |
| 6,031,653 A | 2/2000 | Wang |
| 6,040,937 A | 3/2000 | Miles |
| 6,097,145 A | 8/2000 | Kastalsky et al. |
| 6,104,525 A | 8/2000 | Min |
| 6,137,182 A | 10/2000 | Hause et al. |
| 6,170,332 B1 | 1/2001 | MacDonald et al. |
| 6,201,633 B1 | 3/2001 | Peeters et al. |
| 6,249,039 B1 | 6/2001 | Harvey et al. |
| 6,282,010 B1 | 8/2001 | Sulzbach et al. |
| 6,288,824 B1 | 9/2001 | Kastalsky |
| 6,295,154 B1 | 9/2001 | Laor et al. |
| 6,324,192 B1 | 11/2001 | Tayebati |
| 6,327,071 B1 | 12/2001 | Kimura |
| 6,351,329 B1 | 2/2002 | Greywal |
| 6,391,675 B1 | 5/2002 | Ehmke et al. |
| 6,407,851 B1 | 6/2002 | Islam et al. |
| 6,434,291 B1 | 8/2002 | Kessler et al. |
| 6,447,126 B1 | 9/2002 | Hornbeck |
| 6,449,084 B1 | 9/2002 | Guo |
| 6,466,354 B1 | 10/2002 | Gudeman |
| 6,473,072 B1 | 10/2002 | Comiskey et al. |
| 6,513,911 B1 | 2/2003 | Ozaki et al. |
| 6,522,801 B1 | 2/2003 | Aksyuk et al. |
| 6,537,427 B1 | 3/2003 | Raina et al. |
| 6,577,785 B1 | 6/2003 | Spahn et al. |
| 6,597,490 B2 | 7/2003 | Tayebati |
| 6,602,791 B2 | 8/2003 | Ouellet et al. |
| 6,625,047 B2 | 9/2003 | Coleman, Jr. |
| 6,642,913 B1 | 11/2003 | Kimura et al. |
| 6,653,997 B2 | 11/2003 | Van Gorkom et al. |
| 6,674,562 B1 * | 1/2004 | Miles .......................... 359/291 |
| 6,680,792 B2 | 1/2004 | Miles |
| 6,704,475 B2 | 3/2004 | Jin et al. |
| 6,707,594 B2 | 3/2004 | Holmes |
| 6,710,908 B2 | 3/2004 | Miles et al. |
| 6,760,146 B2 | 7/2004 | Ikeda et al. |
| 6,768,097 B1 | 7/2004 | Viktorovitch et al. |
| 6,778,728 B2 | 8/2004 | Taylor |
| 6,803,534 B1 | 10/2004 | Chen et al. |
| 6,859,301 B1 | 2/2005 | Islam et al. |
| 6,881,535 B2 | 4/2005 | Yamaguchi |
| 6,906,849 B1 | 6/2005 | Mi et al. |
| 6,940,631 B2 | 9/2005 | Ishikawa |
| 6,958,847 B2 | 10/2005 | Lin |
| 6,960,305 B2 * | 11/2005 | Doan et al. ........................ 216/2 |
| 6,967,757 B1 | 11/2005 | Allen et al. |
| 6,980,350 B2 | 12/2005 | Hung et al. |
| 6,982,820 B2 | 1/2006 | Tsai |
| 6,987,432 B2 | 1/2006 | Lutz et al. |
| 6,995,890 B2 | 2/2006 | Lin |
| 7,006,272 B2 | 2/2006 | Tsai |
| 7,016,095 B2 | 3/2006 | Lin |
| 7,016,099 B2 | 3/2006 | Ikeda et al. |
| 7,027,200 B2 * | 4/2006 | Shi et al. ....................... 359/290 |
| 7,027,202 B1 | 4/2006 | Hunter et al. |
| 7,041,571 B2 | 5/2006 | Strane |
| 7,042,619 B1 | 5/2006 | McGinley et al. |
| 7,042,643 B2 | 5/2006 | Miles |
| 7,057,783 B2 | 6/2006 | Kato et al. |
| 7,064,880 B2 | 6/2006 | Mushika |
| 7,110,158 B2 | 9/2006 | Miles |
| 7,119,945 B2 | 10/2006 | Cummings et al. |
| 7,123,216 B1 | 10/2006 | Miles |
| 7,193,768 B2 | 3/2007 | Lin |
| 7,202,101 B2 * | 4/2007 | Gabriel et al. .................. 438/53 |
| 7,233,029 B2 | 6/2007 | Mochizuki |
| 7,291,921 B2 | 11/2007 | Lin |
| 7,349,141 B2 * | 3/2008 | Tung et al. ..................... 359/260 |
| 7,476,951 B2 * | 1/2009 | Campbell et al. ............. 257/415 |
| 2001/0003487 A1 | 6/2001 | Miles |
| 2001/0010953 A1 | 8/2001 | Kang et al. |
| 2001/0026951 A1 | 10/2001 | Vergani et al. |
| 2001/0028503 A1 | 10/2001 | Flanders et al. |
| 2001/0055208 A1 | 12/2001 | Kimura |
| 2002/0015215 A1 | 2/2002 | Miles |
| 2002/0031155 A1 | 3/2002 | Tayebati et al. |
| 2002/0054422 A1 | 5/2002 | Carr et al. |
| 2002/0055253 A1 | 5/2002 | Rudhard |
| 2002/0075555 A1 | 6/2002 | Miles |
| 2002/0109899 A1 | 8/2002 | Ohtaka et al. |
| 2002/0110948 A1 | 8/2002 | Huang et al. |
| 2002/0131682 A1 | 9/2002 | Nasiri et al. |
| 2002/0135857 A1 | 9/2002 | Fitzpatrick et al. |
| 2002/0141690 A1 | 10/2002 | Jin et al. |
| 2002/0146200 A1 | 10/2002 | Kudric et al. |
| 2002/0149850 A1 | 10/2002 | Heffner et al. |
| 2002/0168136 A1 | 11/2002 | Atia et al. |
| 2002/0195681 A1 | 12/2002 | Melendez et al. |
| 2003/0015936 A1 | 1/2003 | Yoon et al. |
| 2003/0036215 A1 | 2/2003 | Reid |
| 2003/0053078 A1 | 3/2003 | Missey et al. |
| 2003/0072070 A1 | 4/2003 | Miles |
| 2003/0091072 A1 | 5/2003 | Wang et al. |
| 2003/0112096 A1 | 6/2003 | Potter |
| 2003/0119221 A1 | 6/2003 | Cunningham et al. |
| 2003/0123126 A1 | 7/2003 | Meyer et al. |
| 2003/0138213 A1 | 7/2003 | Jiin et al. |
| 2003/0164350 A1 | 9/2003 | Hanson et al. |
| 2003/0201784 A1 | 10/2003 | Potter |
| 2003/0231373 A1 | 12/2003 | Kowarz et al. |
| 2004/0008396 A1 | 1/2004 | Stappaerts |
| 2004/0027225 A1 | 2/2004 | Lee et al. |
| 2004/0051929 A1 | 3/2004 | Sampsell et al. |
| 2004/0056742 A1 | 3/2004 | Dabbaj |
| 2004/0058532 A1 | 3/2004 | Miles et al. |
| 2004/0070813 A1 | 4/2004 | Aubuchon |
| 2004/0080035 A1 | 4/2004 | Delapierre |
| 2004/0080807 A1 | 4/2004 | Chen et al. |
| 2004/0100680 A1 | 5/2004 | Huibers et al. |

| | | | |
|---|---|---|---|
| 2004/0124073 A1 | 7/2004 | Pillans et al. | |
| 2004/0125281 A1 | 7/2004 | Lin | |
| 2004/0136045 A1 | 7/2004 | Tran | |
| 2004/0136076 A1 | 7/2004 | Tayebati | |
| 2004/0150869 A1 | 8/2004 | Kasai | |
| 2004/0174583 A1 | 9/2004 | Chen et al. | |
| 2004/0201908 A1 | 10/2004 | Kaneko | |
| 2004/0207497 A1 | 10/2004 | Hsu et al. | |
| 2004/0217919 A1 | 11/2004 | Piehl et al. | |
| 2004/0226909 A1 | 11/2004 | Tzeng | |
| 2004/0240032 A1 | 12/2004 | Miles | |
| 2005/0024557 A1 | 2/2005 | Lin | |
| 2005/0046919 A1 | 3/2005 | Taguchi et al. | |
| 2005/0046922 A1 | 3/2005 | Lin et al. | |
| 2005/0128565 A1 | 6/2005 | Ljungblad | |
| 2005/0195464 A1 | 9/2005 | Faase et al. | |
| 2005/0237743 A1 | 10/2005 | Payne et al. | |
| 2005/0249966 A1 | 11/2005 | Tung et al. | |
| 2006/0006138 A1 | 1/2006 | Lin | |
| 2006/0018348 A1 | 1/2006 | Przybyla et al. | |
| 2006/0024620 A1 | 2/2006 | Nikkel et al. | |
| 2006/0037933 A1* | 2/2006 | Wang et al. | 216/2 |
| 2006/0066932 A1 | 3/2006 | Chui et al. | |
| 2006/0082863 A1 | 4/2006 | Piehl et al. | |
| 2008/0026328 A1 | 1/2008 | Miles | |

FOREIGN PATENT DOCUMENTS

| | | |
|---|---|---|
| DE | 10228946 | 1/2004 |
| EP | 0 035 299 | 9/1983 |
| EP | 1 170 618 | 1/2002 |
| EP | 1 197 778 | 4/2002 |
| EP | 1 484 635 | 12/2004 |
| FR | 2824643 | 10/1999 |
| JP | 06301054 | 10/1994 |
| JP | 08293580 | 11/1996 |
| JP | 2002-277771 | 9/2002 |
| JP | 2002-341267 | 11/2002 |
| JP | 2003-215475 | 7/2003 |
| JP | 2003-340795 | 12/2003 |
| JP | 2004157527 | 6/2004 |
| TW | 508458 | 11/2002 |
| TW | 573136 | 1/2004 |
| WO | WO 01/56919 | 8/2001 |
| WO | WO 02/38491 | 5/2002 |
| WO | WO 02/079853 | 10/2002 |
| WO | WO 04/000717 | 12/2003 |
| WO | WO 2005/006364 | 1/2005 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.
Goossen et al., "Possible Display Applications of the Silicon Mechanical Anti-Reflection Switch," Society for Information Display (1994).
Joannopoulos et al., "Photonic Crystals: Molding the Flow of Light," Princeton University Press (1995).
Magel, "Integrated Optic Devices Using Micromachined Metal Membranes," SPIE vol. 2686, 0-8194-2060-Mar. (1996).
ISR and WO for PCT/US05/030033 filed Aug. 23, 2005.
Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.
Fork, et al., "P-67: Chip on Glass Bonding using StressedMetal™ Technology" Sid 05 Digest, May 24, 2005.
Lee et al., "Improvement of the surface characteristics of sputtered metal layer for a MEMS micro-mirror switch," Thin Solid Films, vol. 447, Jan. 30, 2004, pp. 615-618.
Office Action dated Nov. 21, 2006 in U.S. Appl. No. 11/173,551.
Office Action dated May 18, 2007 in U.S. Appl. No. 11/173,551.
Office Action dated Nov. 2, 2007 in U.S. Appl. No. 11/173,551.
Office Action dated Nov. 29, 2007 in U.S. Appl. No. 11/173,551.
IPRP for PCT/US2005/030033 filed Aug. 23, 2006.

* cited by examiner

MIRROR AND MIRROR LAYER FOR OPTICAL MODULATOR AND METHOD

CROSS REFERENCE TO RELATED APPLICATION

This application is a divisional of U.S. patent application Ser. No. 11/173,551, filed Jul. 1, 2005 and claims the benefit under 35 U.S.C. §119(e) of U.S. Application No. 60/613,538, filed Sep. 27, 2004, the disclosures of which are incorporated herein by reference.

BACKGROUND

1. Field of the Invention

This application is generally related to optical devices, and more particularly, to interferometric optical modulators.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

Described herein are systems, devices, and methods relating to fabricating electronic devices, for example, microelectromechanical systems (MEMS) devices, including optical modulators such as interferometric optical modulators. The interferometric modulator disclosed herein comprises a movable mirror. Some embodiments of the disclosed movable mirror exhibit a combination of improved properties compared to known mirrors, including reduced moving mass, improved mechanical properties, and reduced etch times.

Some embodiments disclosed herein provide a microelectromechanical systems mirror comprising a mirror body, wherein a surface of the mirror body comprises a reflective surface, and the mirror body comprises at least one cavity.

Other embodiments provide a microelectromechanical systems mirror comprising a mirror body, wherein a surface of the mirror body comprises a reflective surface, the mirror body comprises a body material and a sacrificial material, and the sacrificial material is preferentially etchable over the body material.

Other embodiments provide a method for fabricating a microelectromechanical systems mirror comprising a mirror body, wherein a surface of the mirror body comprises a reflective surface, the method comprising: depositing a mirror body comprising a reflective surface, wherein the mirror body comprises a body material and a sacrificial material, and the sacrificial material is preferentially etchable over the body material.

Other embodiments provide a method for fabricating a microelectromechanical systems mirror comprising a mirror body, wherein a surface of the mirror body comprises a reflective surface disposed on a surface of the mirror body, and wherein the mirror body comprises at least one cavity, the method comprising: depositing a mirror body comprising the reflective surface; and etching a cavity in the mirror body.

Other embodiments provide a microelectromechanical systems mirror comprising a mirror body and a reflective surface disposed on a face of the body, wherein the mirror body comprises a means for forming a cavity therein.

Other embodiments provide a microelectromechanical systems mirror comprising a mirror body, wherein a surface of the mirror body comprises a reflective surface, the microelectromechanical systems mirror manufactured by a method comprising: forming the mirror body comprising the reflective surface, wherein the mirror body comprises a body material and a sacrificial material, and the sacrificial material is preferentially etchable over the body material; and etching at least some of the sacrificial material from the mirror body.

Other embodiments provide an interferometric modulator comprising a first mirror and a second mirror, wherein the second mirror comprises a mirror body, wherein a surface of the mirror body comprises a reflective surface disposed on a face of the body, wherein the body comprises at least one cavity.

Other embodiments provide a method for fabricating a microelectromechanical systems mirror comprising a mirror body, wherein a surface of the mirror body comprises a reflective surface, the method comprising: forming a mirror body comprising a reflective surface, wherein the mirror body comprises a body material and a sacrificial material, and the sacrificial material is preferentially etchable over the body material; and treating at least a portion of the sacrificial material to provide a treated material, wherein the sacrificial material is selectively etchable over the treated material and the body material.

Other embodiments provide a display system comprising: a display; a processor in electrical communication with the display, wherein the processor configured to process image data; and a memory device in electrical communication with the processor. The display comprises an array of interferometric modulators, each interferometric modulator comprising a first mirror and a second mirror, wherein the second mirror comprises a mirror body, wherein a surface of the mirror body comprises a reflective surface disposed on a face of the body, wherein the body comprises at least one cavity.

BRIEF DESCRIPTION OF THE DRAWINGS

These and other aspects of the invention will be readily apparent from the following description and from the appended drawings (not to scale), which are meant to illustrate and not to limit the invention.

DETAILED DESCRIPTION OF CERTAIN EMBODIMENTS

Figure 1:
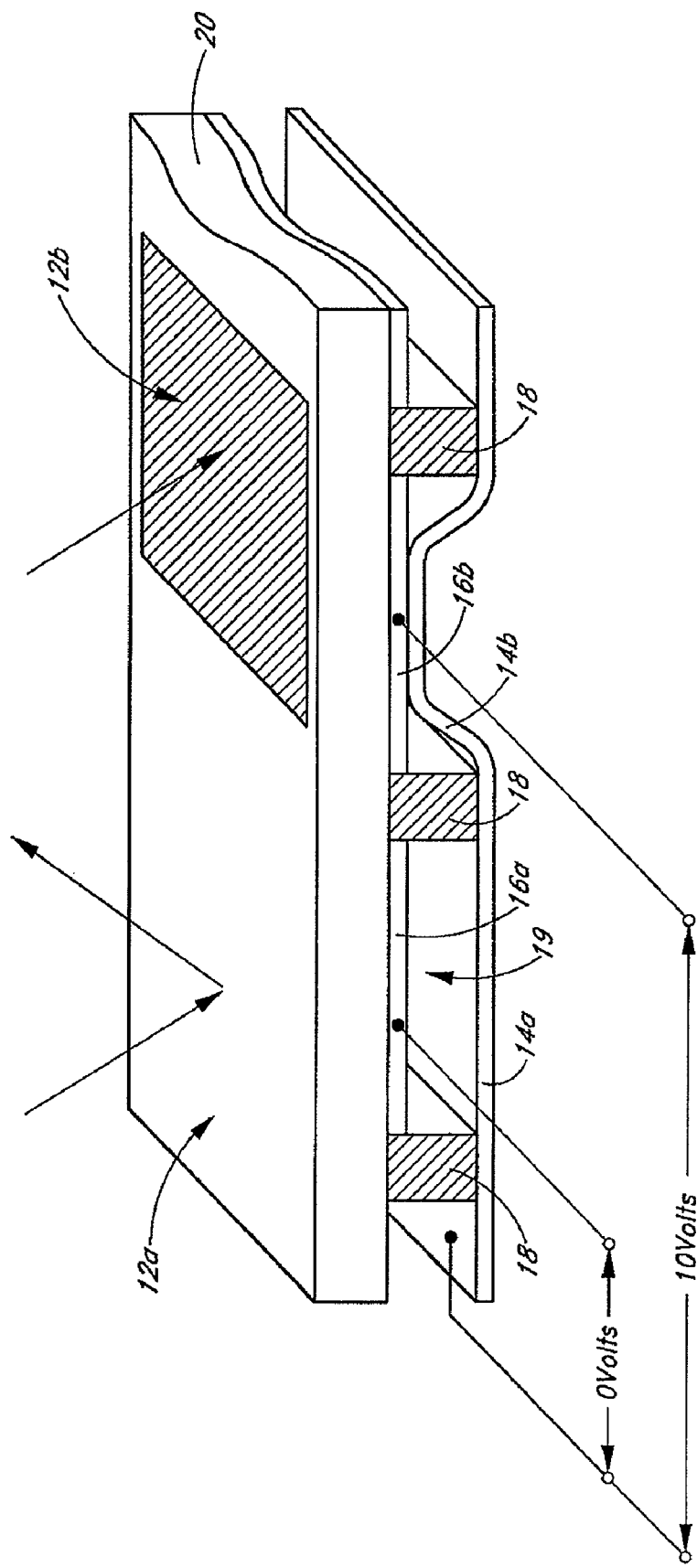
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Embodiments of the disclosed interferometric modulator comprise a movable mirror comprising a reflective surface disposed on a mirror body comprising one or more voids and/or cavities. In some embodiments, the voids are formed by one or more layers of a body material that are substantially parallel to the reflective surface. In some embodiments, the mirror body comprises one or more cavities defined by a porous mirror body. In some embodiments, the mirror body comprises a patterned structure defining one or more cavities, wherein the patterned structure is substantially perpendicular to the reflective surface. Also disclosed are embodiments of a method for fabricating the disclosed interferometric modulator and movable mirror.

Embodiments of the disclosed movable mirror have reduced moving mass compared with similar solid mirrors with the same dimensions, thereby improving the responsiveness of an interferometric modulator using the mirror. Embodiments of the disclosed movable mirror exhibit superior mechanical properties than similar solid mirrors with the same mass, for example, strength, rigidity, durability, and the like, thereby improving the optical performance of an interferometric modulator using the mirror. Embodiments of the disclosed movable mirror are more rapidly etched than similar solid mirrors with the same dimensions, thereby improving the throughput in the manufacturing process of an interferometric modulator using the mirror. In some embodiments of the disclosed movable mirror, the length and/or width of the movable mirror are independently from about 10 µm to about 1000 µm, for example, from about 10 µm to about 100 µm, from about 100 µm to about 500 µm, or from about 500 µm to about 1000 µm. In some embodiments, the movable mirror is from about 1 µm to about 5 µm thick, for example, from about 3 µm to about 4 µm thick.

Those skilled in the art will understand that the materials used for the components of the interferometric modulator depend on factors including the mechanical properties of the material, the cost of the material, the ease of applying the material, the ease of removing the material, the compatibility of the material with other materials in the device, conditions under which the material is stable, and the like. Accordingly, the selection of a material for one component in the interferometric modulator can affect the materials used for another component of the device. As discussed above, some embodiments for fabricating an interferometric modulator include materials that are removed in the manufacturing process, which are also referred to as sacrificial materials. The properties of these sacrificial materials are also considered when selecting the materials for the interferometric modulator components. In particular, the conditions under which a sacrificial material is removed, for example, by etching, is a consideration when selecting the particular materials used in the interferometric modulator. In some embodiments, the disclosed interferometric modulator and movable mirror are fabricated using methods and materials known in the art for fabricating integrated electronic devices, for example, integrated circuits, and/or microelectromechanical systems devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIG. 2 through FIG. 5 illustrate one exemplary process and system for using an array of interferometric modulators in a display application.

Figure 2:
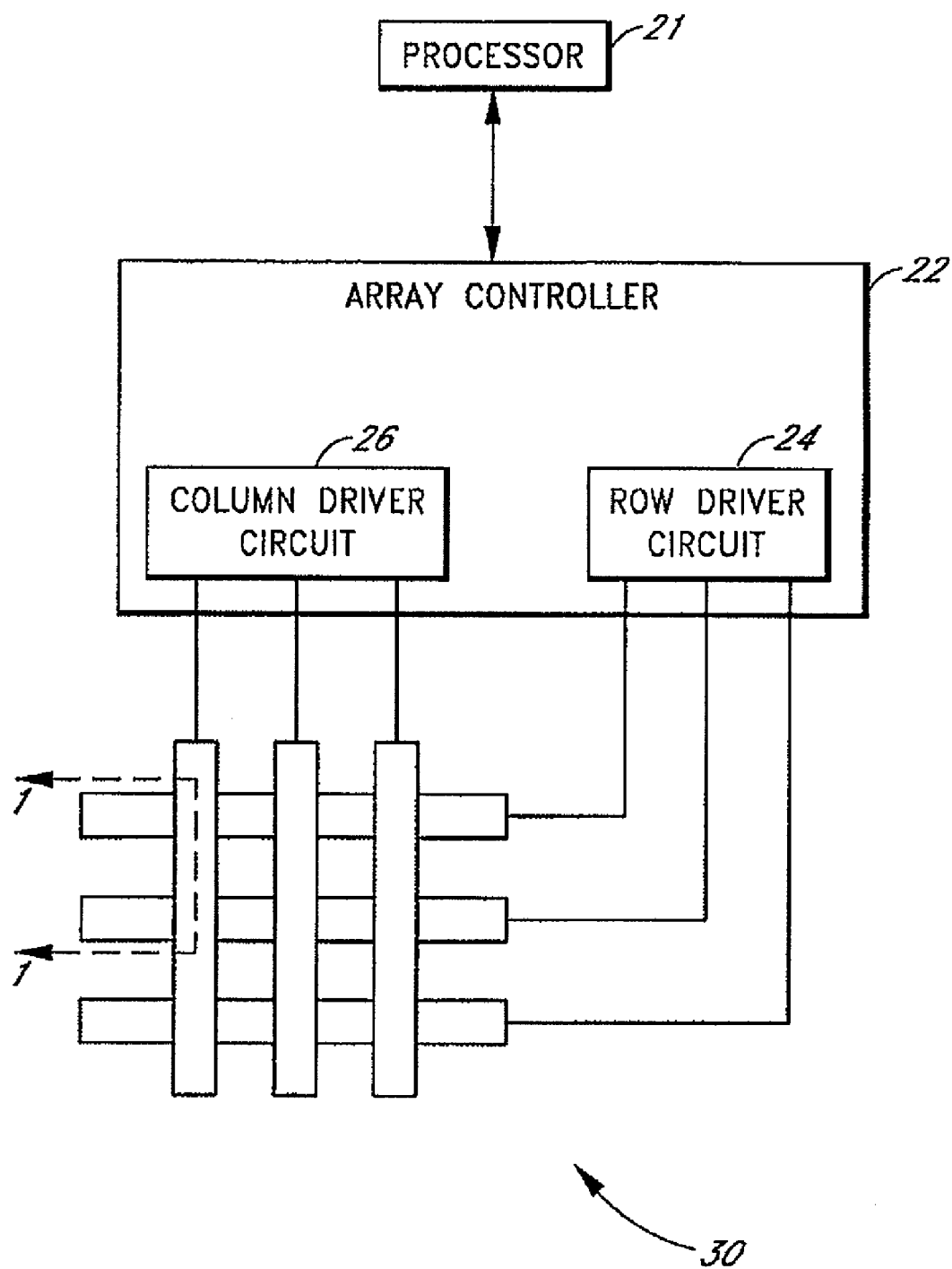
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
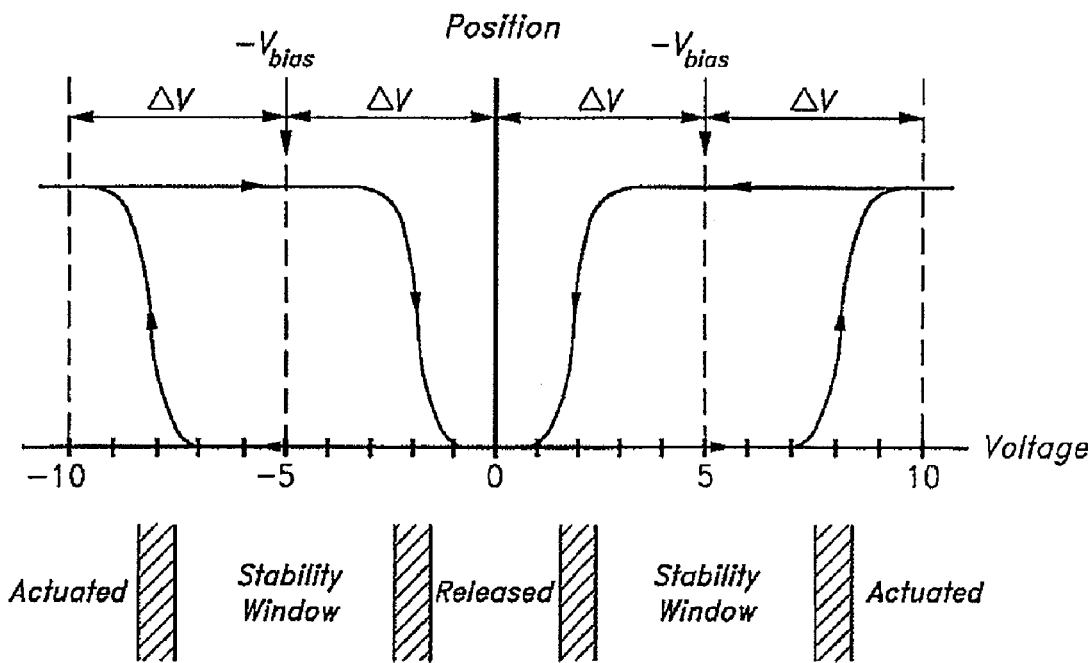
FIG. 3 is a diagram of movable mirror position versus applied voltage for one exemplary embodiment of an interferometric modulator of FIG. 1.
FIG. 4 is an illustration of sets of row and column voltages that may be used to drive an interferometric modulator display.

FIG. 4 and FIG. 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, relaxing the pixel is accomplished by setting the appropriate column to $-V_{bias}$, and the appropriate row to the same $-\Delta V$, producing a zero volt potential difference across the pixel.

Figure 5A:
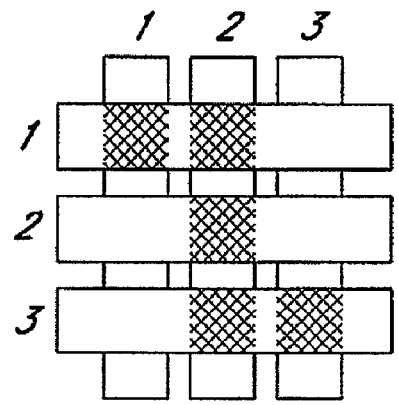
FIG. 5A and FIG. 5B illustrate one exemplary timing diagram for row and column signals that may be used to write a frame of display data to the 3×3 interferometric modulator display of FIG. 2.
Figure 5B:
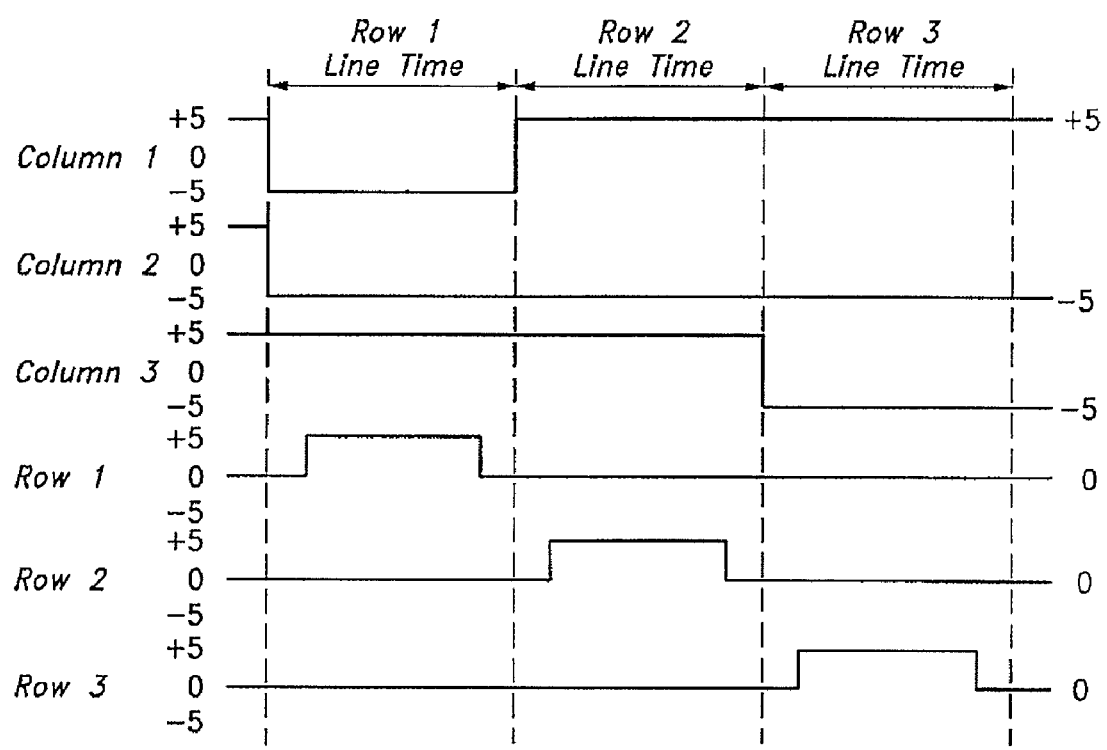

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
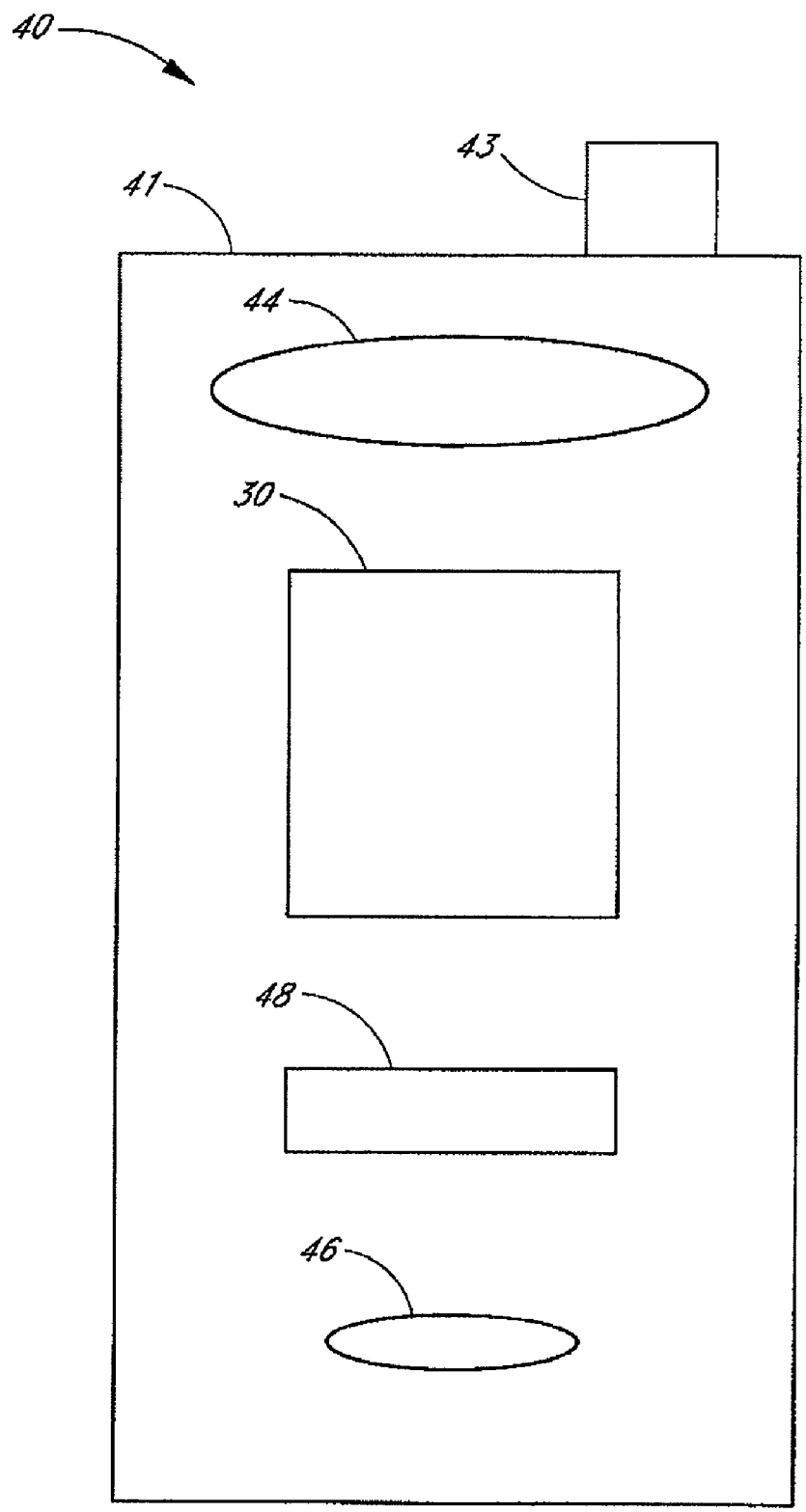
FIG. 6A and FIG. 6B are system block diagrams illustrating an embodiment of a display device.
Figure 6B:
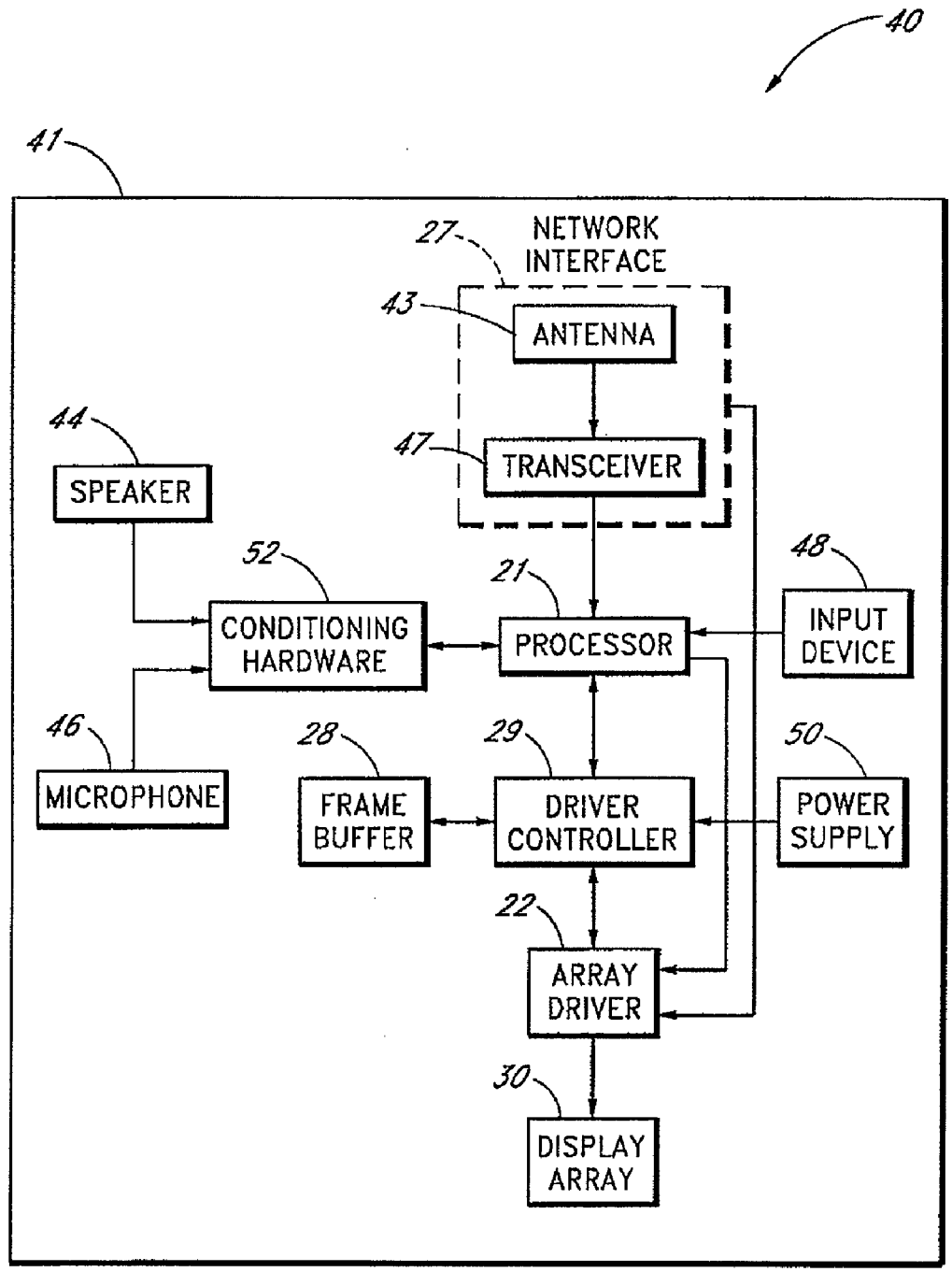

FIG. 6A and FIG. 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22.

Those of skill in the art will recognize that the above-described optimization may be implemented in any number of hardware and/or software components and in various configurations.

Figure 7A:
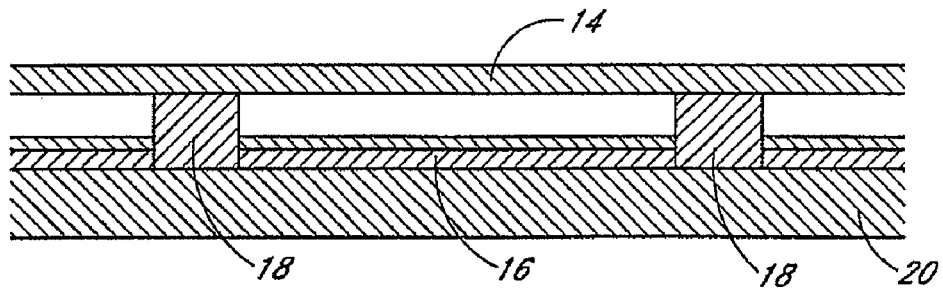
FIG. 7A is a cross section of the device of FIG. 1.
Figure 7B:
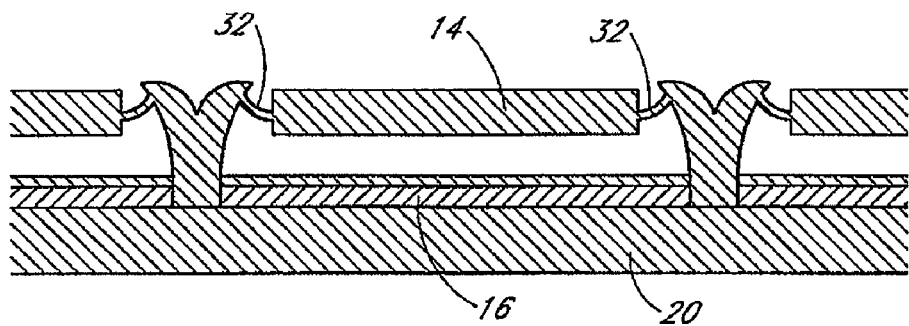
FIG. 7B is a cross section of an alternative embodiment of an interferometric modulator.
Figure 7C:
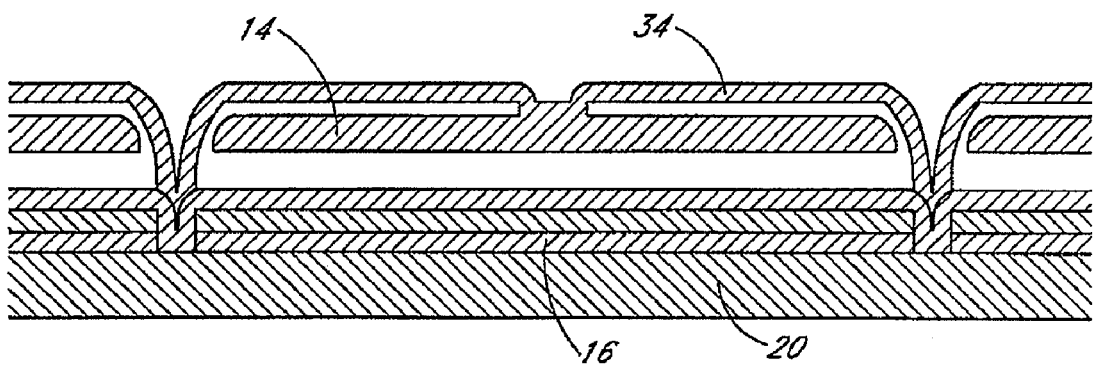
FIG. 7C is a cross section of an alternative embodiment of an interferometric modulator.
Figure 7D:
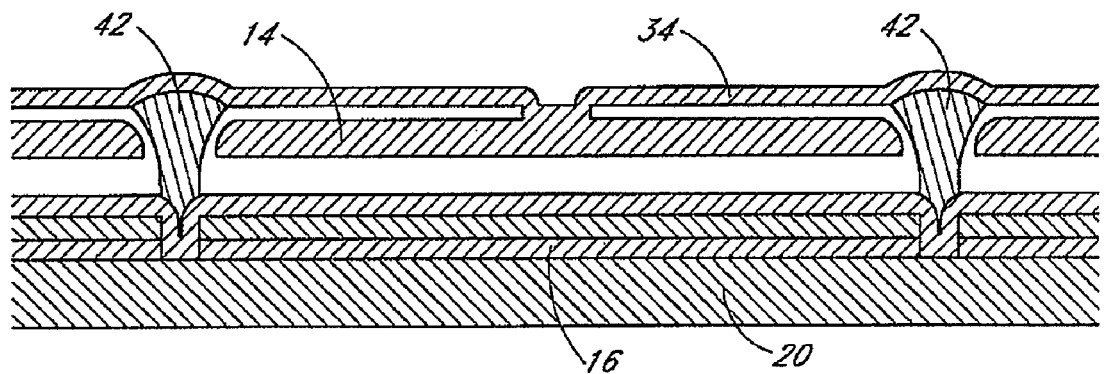
FIG. 7D is a cross section of yet another alternative embodiment of an interferometric modulator.
Figure 7E:
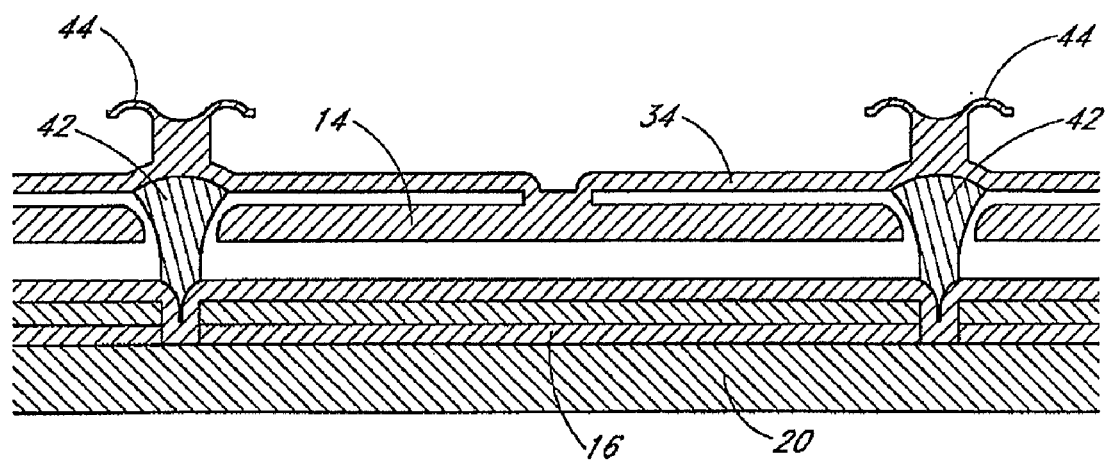
FIG. 7E is a cross section of an additional alternative embodiment of an interferometric modulator.

The details of the structure of interferometric modulators that operate in accordance with the principles set forth above may vary widely. For example, FIG. 7A-FIG. 7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIG. 7A-FIG. 7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIG. 7A-FIG. 7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the optically transmissive substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIG. 7C-FIG. 7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
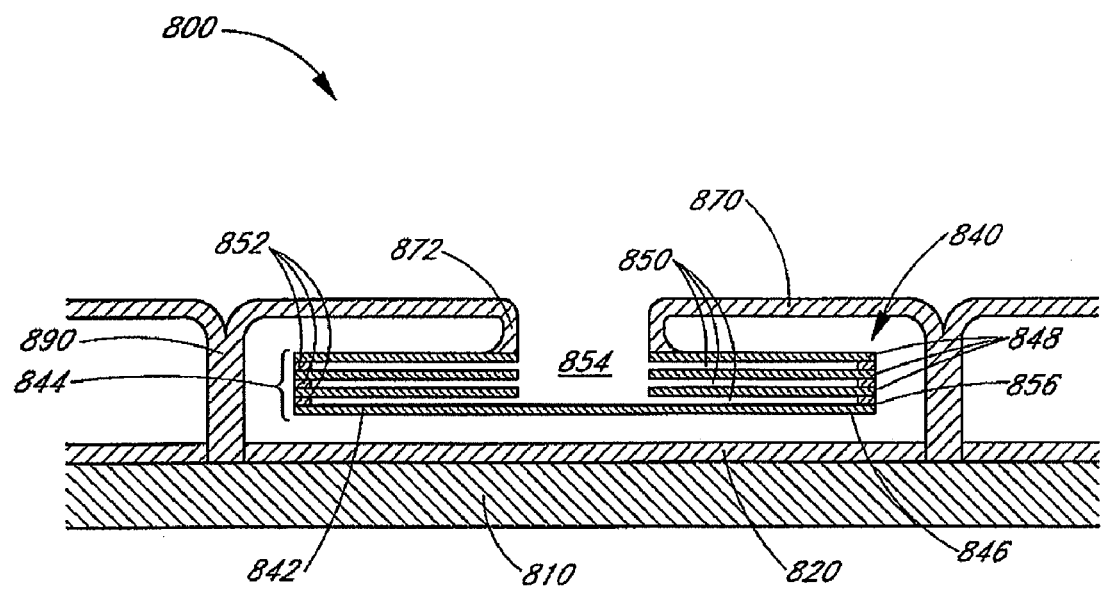
FIG. 8A and FIG. 8B illustrate in cross section embodiments of an interferometric modulator comprising a movable mirror comprising layers of a body material.

FIG. 8A illustrates in cross section an embodiment of an interferometric modulator comprising a mirror in which the mirror body comprises cavities and/or voids formed by a structure that is substantially parallel to the reflective surface. The interferometric modulator 800 comprises a substrate 810, an optical stack 820, a movable mirror 840, and a layer of a deformable material 870 supported by posts 890. The layer of deformable material 870 is also referred to herein a "mechanical layer." Those skilled in the art will understand some embodiments of a "mechanical layer" comprise a plurality of layers or other features. As described above, the optical stack 820 typically comprises an electrode material, for example, indium tin oxide (ITO), and a partially reflective layer, for example, chromium. In some embodiments, the optical stack also includes other layers, for example, an insulating layer, for example, silicon dioxide. A connector 872 secures the movable mirror 840 to the mechanical layer 870. In the illustrated embodiment, the connector 872 is hollow. Such a connector is referred to herein as an "annular connector." In other embodiments, the connector 872 is not an annular connector. In other embodiments similar to the embodiments illustrated in FIG. 7A and FIG. 7B, the movable mirror and mechanical layer share one or more layers.

The movable mirror 840 comprises a mirror body 844 comprising a reflective surface 842. The body 844 comprises layers of a body material 848 with one or more voids or cavities 850 defined by the adjacent layers of the body material 848. The perimeter of the body 844 comprises spacers 852 disposed between the layers of the body material 848. In the illustrated embodiment, the spacers 852 comprise surfaces that are substantially perpendicular to the reflective surface, that define the extent of the cavities 850. The body 844 also comprises one or more openings 854, the function of which is discussed in greater detail below. In the illustrated embodiment, the body 844 also comprises an etch stop 856. The etch stop 856 comprises any suitable material. Exemplary etch-stop materials include titanium, silicon dioxide, tungsten, amorphous silicon, germanium, and combinations thereof. Some embodiments do not comprise an etch stop.

In the illustrated embodiment, the mirror body 844 comprises a reflective layer 846, a surface of which comprises the reflective surface 842. In other embodiments, the reflective surface 842 is a surface of a layer of body material 848. In some embodiments, the reflective layer 846 is a different material from the layers of the body material 848. The reflective surface 842 is a surface of any suitable material known in the art, for example, aluminum, aluminum alloys, chromium, gold, silver, and combinations thereof. In some embodiments, the reflective surface 842 is the surface of a dielectric mirror.

Figure 8B:
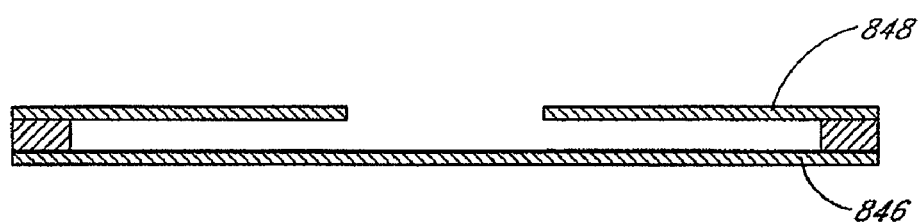

The number and thicknesses of the layers of the body material 848, as well as the thicknesses of the cavities 850 and spacers 852 depend on factors known in the art, including the dimensions of the movable mirror 840, the mechanical properties of the materials, the desired mechanical properties of the movable mirror 840, and the like. For example, FIG. 8B illustrates an embodiment of a movable mirror 840 that comprises two layers: a layer of a body material 848 at the top of the movable mirror 840 and a reflective layer 846.

In some embodiments, the overall thickness of the movable mirror 840 is from about 0.5 µm to about 2 µm. In some embodiments, each layer of body material 848 and each spacer 852 is independently from about 1 Å to about 500 Å thick or from about 30 Å to about 200 Å thick.

Returning to FIG. 8A, in the illustrated embodiment, all of the layers of the body material 848 have substantially that same thickness. Those skilled in the art will understand that in other embodiments, the thickness of at least one layer of the body material 848 is different from the thickness of at least another layer. Furthermore, the thicknesses of the cavities 850 are substantially the same in the illustrated embodiment. In other embodiments, the thicknesses of the cavities 850 are not substantially the same.

The body material comprises any suitable material, for example, aluminum, aluminum alloys, aluminum oxide, silicon oxide, amorphous silicon, nickel, titanium, molybdenum, and combinations thereof. In some embodiments, each of the layers of the body material 848 is the same material. In other embodiments, at least one layer of the body material has a different composition than another layer of body material.

The spacers 852 are any suitable material. In some embodiments, the spacers 852 are a sacrificial material that is selectively and/or preferentially etchable over the body material, for example, polycrystalline silicon, titanium, zirconium, hafnium, vanadium, tantalum, chromium, molybdenum, tungsten, manganese, polymers, and combinations thereof. Suitable polymers are known in the art and include polymethylmethacrylate (PMMA) and photoresists. In these embodiments, the sacrificial material is different from the body material. Those skilled in the art will understand that the selection of the sacrificial material depends on the etching conditions used to remove the sacrificial material. In some preferred embodiments, the sacrificial material is removable using a vapor phase dry etchant, for example, xenon difluoride, or a plasma etch procedure. Those skilled in the art will understand that all materials are etchable under the appropriate conditions and that the description herein of a material as preferentially or selectively etchable, or as etch resistant is in comparison with the other materials present in the device and the particular conditions to which the material is exposed.

Some embodiments use a single type sacrificial material 852 in the movable mirror 840. Other embodiments use a plurality of types sacrificial materials in the movable mirror 840. In the illustrated embodiment, the sacrificial material in the movable mirror 840 is different from other sacrificial materials used in the manufacture of the interferometric modulator 800 and is not completely removed in the etch step that releases the movable mirror, as discussed in greater detail below. In other embodiments, all of the sacrificial materials used in the fabrication of the interferometric modulator are removable in a single etching step, for example, in the mirror release etch, although multiple etch steps are also contemplated.

Suitable etching conditions are known in the art, for example, wet etches, dry etches, and electrochemical etches. For example, some embodiments use a wet etch to etch aluminum and/or aluminum alloys, for example, acidic etches, or buffered oxide etch (BOE). In some embodiments using polymeric and/or organic layers, these layers are etched by ashing. As discussed above, the materials from which the interferometric modulator 800 is fabricated comprise a system in which their selections are interrelated. For example, those skilled in the art will understand that, some embodiments do not use the optional etch stops disclosed herein, while other embodiments include the deposition of additional etch stops. In some preferred embodiments, the reflective surface 842 is an aluminum surface, the layers of body material 848 are aluminum, and the spacers 852 are titanium.

Those skilled in the art will understand that the order of certain fabrication steps may be changed. It will be apparent that other steps may be added, for example, formation, removal, and/or patterning and etching of additional etch stops and/or hard masks or planarization steps. Some steps may be combined. For example, in some embodiments, the sacrificial materials are selected to permit removal in a single etching step.

Figure 8C:
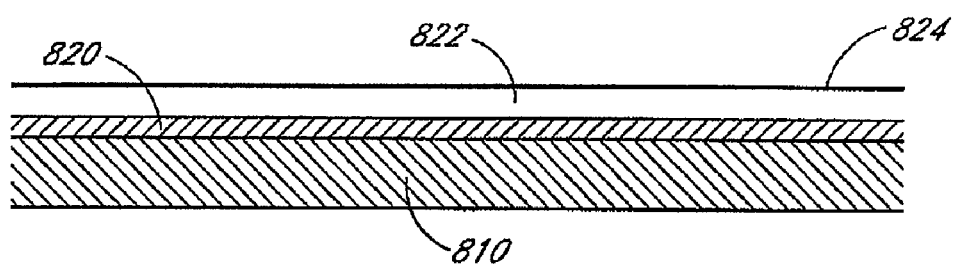
FIG. 8C-FIG. 8J illustrate intermediate structures of an embodiment of a method for fabricating the interferometric modulator illustrated in FIG. 8A.
Figure 8D:
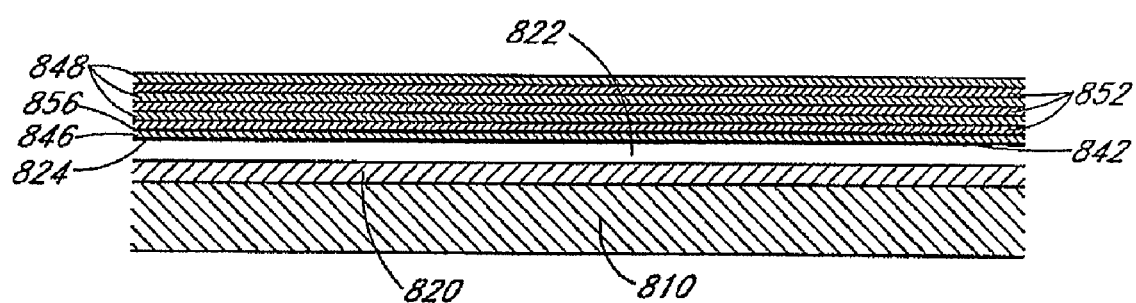
Figure 8E:
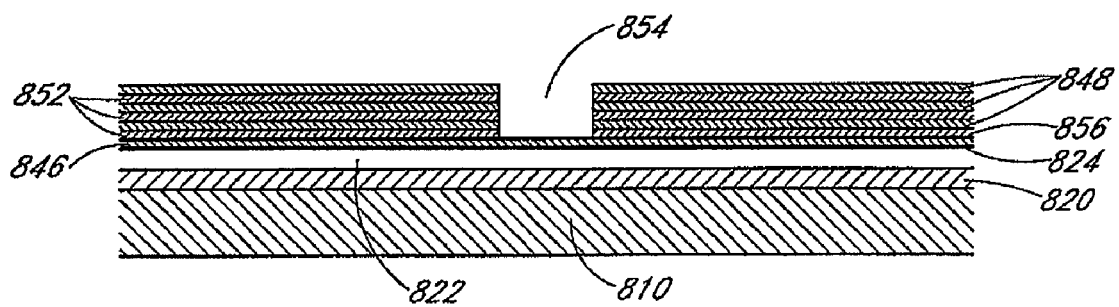
Figure 8F:
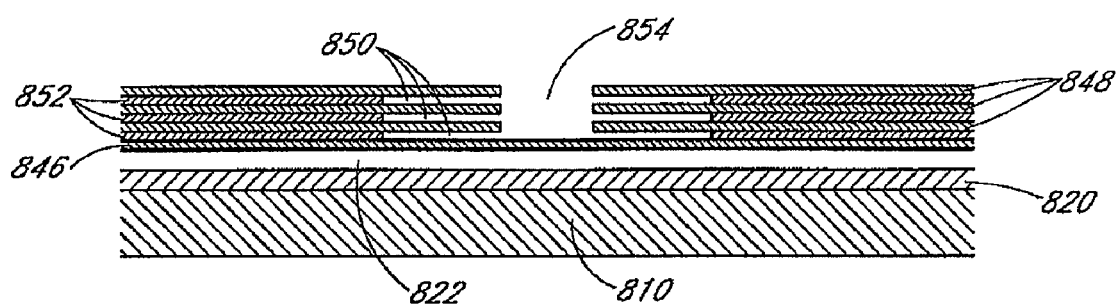
Figure 8G:
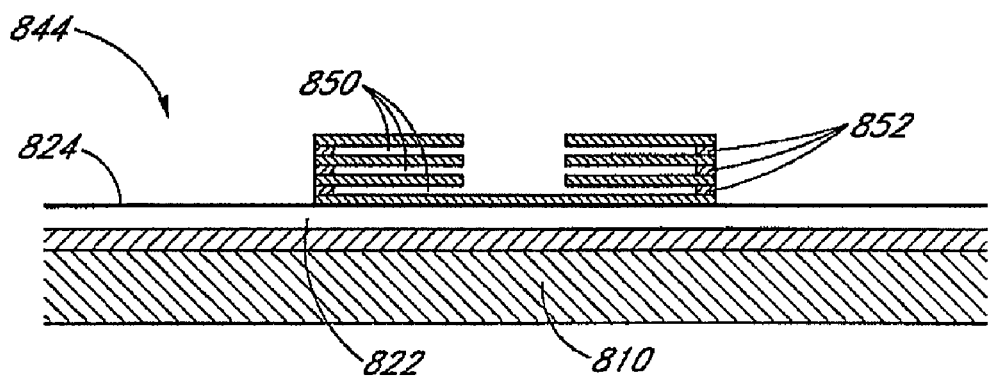
Figure 8H:
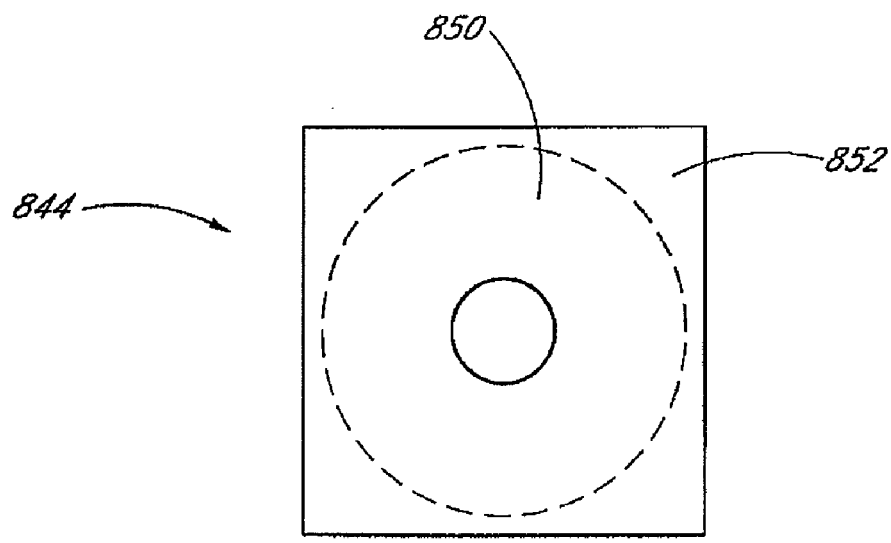
Figure 8I:
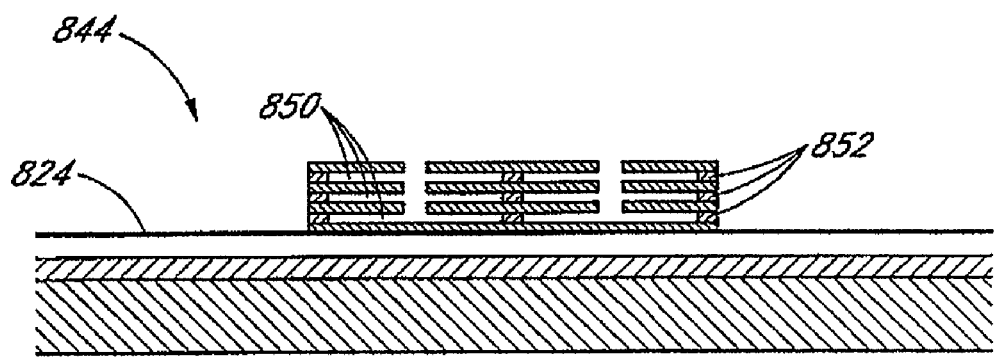
Figure 8J:
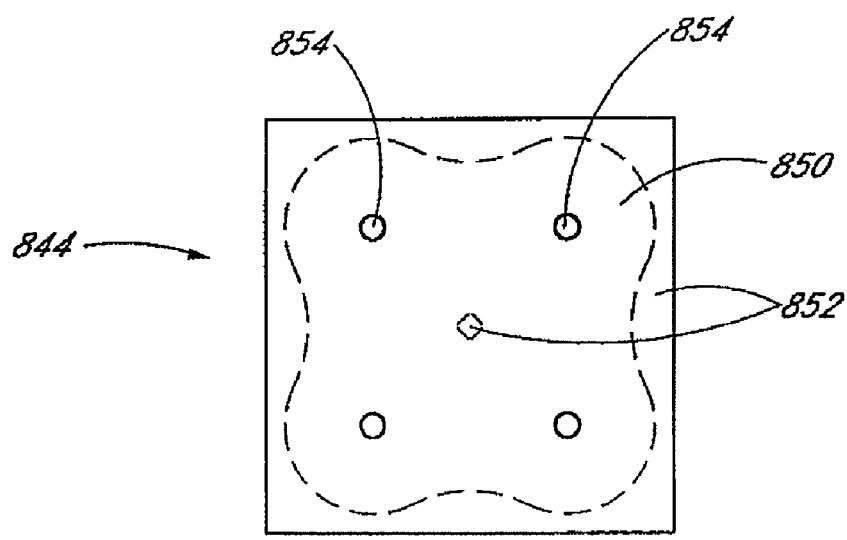
Figure 9A:
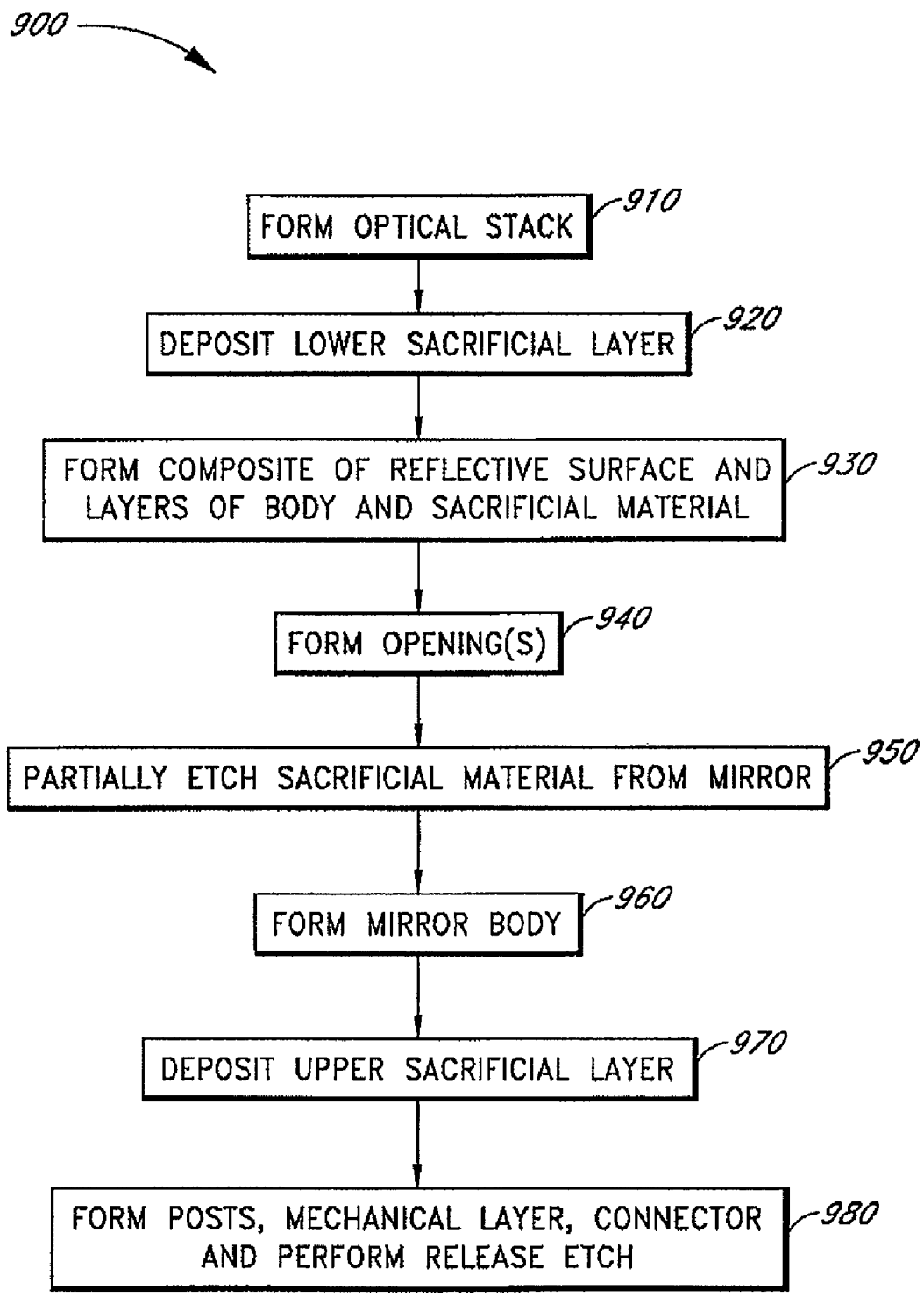
FIG. 9A and FIG. 9B schematically illustrates embodiments of a method for fabricating the interferometric modulator illustrated in FIG. 8A.

A method for fabricating the interferometric modulator 800 illustrated in FIG. 8A is schematically illustrated as method 900 in FIG. 9A with reference to the structures illustrated in FIG. 8A and FIG. 8C through FIG. 8J.

In step 910, an optical stack 820 is formed on a substrate 810 as described above. In step 920, a lower layer of sacrificial material 822 is deposited on the optical stack. An optional first etch stop 824 is deposited on the sacrificial material. The resulting structure is illustrated in FIG. 8C. In some embodiments, the optional first etch stop 824 is a chromium layer, for example, about 80 Å thick. Those skilled in the art will understand that other etch stop materials are also suitable.

In step 930, a composite comprising the reflective surface 842 and layers of the body material 848 and sacrificial material 852 are formed. A layer 846 of a reflective material is deposited, followed by an optional second etch stop 856. Alternating layers of a body material 848 and sacrificial material 852 are then deposited. In some embodiments, each layer 848 of body material is the same material. In other embodiments, at least one layer of body material 848 is a different material from another layer 848 of body material. Similarly, in some embodiments, all of the layers 852 of sacrificial material are the same material. In other embodiments, at least one layer 852 of sacrificial material is a different material from another layer of sacrificial material. In the illustrated embodiment, the first layer above the etch stop 856 is a layer 852 of sacrificial material. In other embodiments, the first layer above the etch stop 854 is a layer 848 of body material. The resulting structure is illustrated in FIG. 8D.

In step 940, the device is masked, patterned, and etched to form one or more openings 854. In the illustrated embodiment, the layers of the body material 848 and sacrificial material 852 are etched to the depth of the second etch stop 856. The resulting structure is illustrated in FIG. 8E.

In step 950, the sacrificial material is partially etched to provide the cavities 850 between the layers of the body material 848 and/or the reflective layer 846. The etch does not completely remove all of the sacrificial material in the layers 852. The remaining sacrificial material forms the spacers 852 in the finished interferometric modulator 800, as discussed below. The etchant accesses the layers 852 of sacrificial material through the opening(s) 854. The resulting structure is illustrated in FIG. 8F. In some embodiments, the etchant is xenon difluoride ($XeF_2$). In some embodiments, the etching is monitored, for example, by monitoring the reflectivity of the device, or the etching products released. In other embodiments, the etching is allowed to proceed for a predetermined time. Those skilled in the art will understand that the etching rate of a layer 852 of sacrificial material depends on the thickness of the layer. In general, a thinner layer will etch more slowly than a thicker layer. In some embodiments, the close tolerances of the manufacturing process provide good reproducibility in the etching step.

In step 960, the device is masked, patterned, and etched to form the mirror body 844, which is illustrated in FIG. 8G and FIG. 8H in cross section and as a top view, respectively. In the illustrated embodiment, the depth of the etch is determined by the first etch stop 824. The extent of etching, that is the boundary between the cavities 850 and the remaining layers 852 of sacrificial material, is indicated in the top view in FIG. 8H. A cross section and top view of an embodiment with four openings 854 is illustrated in FIG. 8I and FIG. 8J, respectively.

In step 970, an upper layer of sacrificial material is deposited. In step 980, the posts 890, mechanical layer 870, and connector 872 are formed, and the movable mirror 840 released, thereby forming the structure illustrated in FIG. 8A. The illustrated embodiment comprises an annular connector 872, which is fabricated, for example, by depositing a suitable material (e.g., aluminum), then masking, patterning, and etching. In some embodiments, the movable mirror 840 is released using a release etch that etches away the lower layer of sacrificial material 822 and the upper layer of sacrificial material. In some embodiments, the lower layer of sacrificial material 822 and the upper layer of sacrificial material comprise molybdenum and the release etch is performed using xenon difluoride.

Figure 8K:
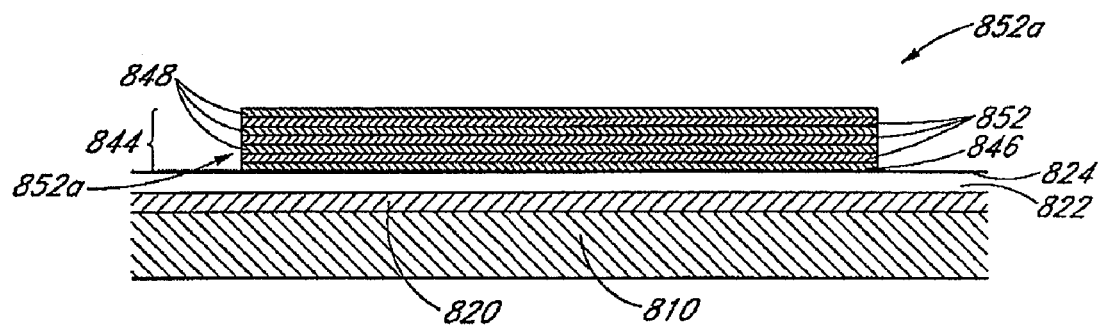
FIG. 8K-FIG. 8L illustrate intermediate structures of another embodiment of a method for fabricating the interferometric modulator illustrated in FIG. 8A.
Figure 8L:
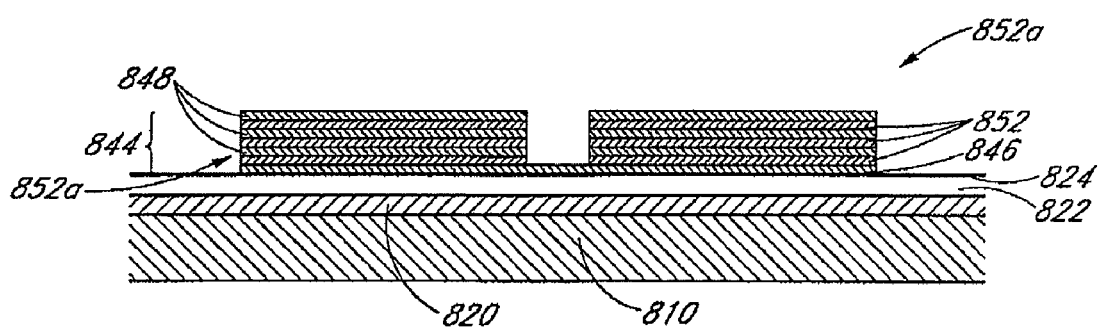
Figure 9B:
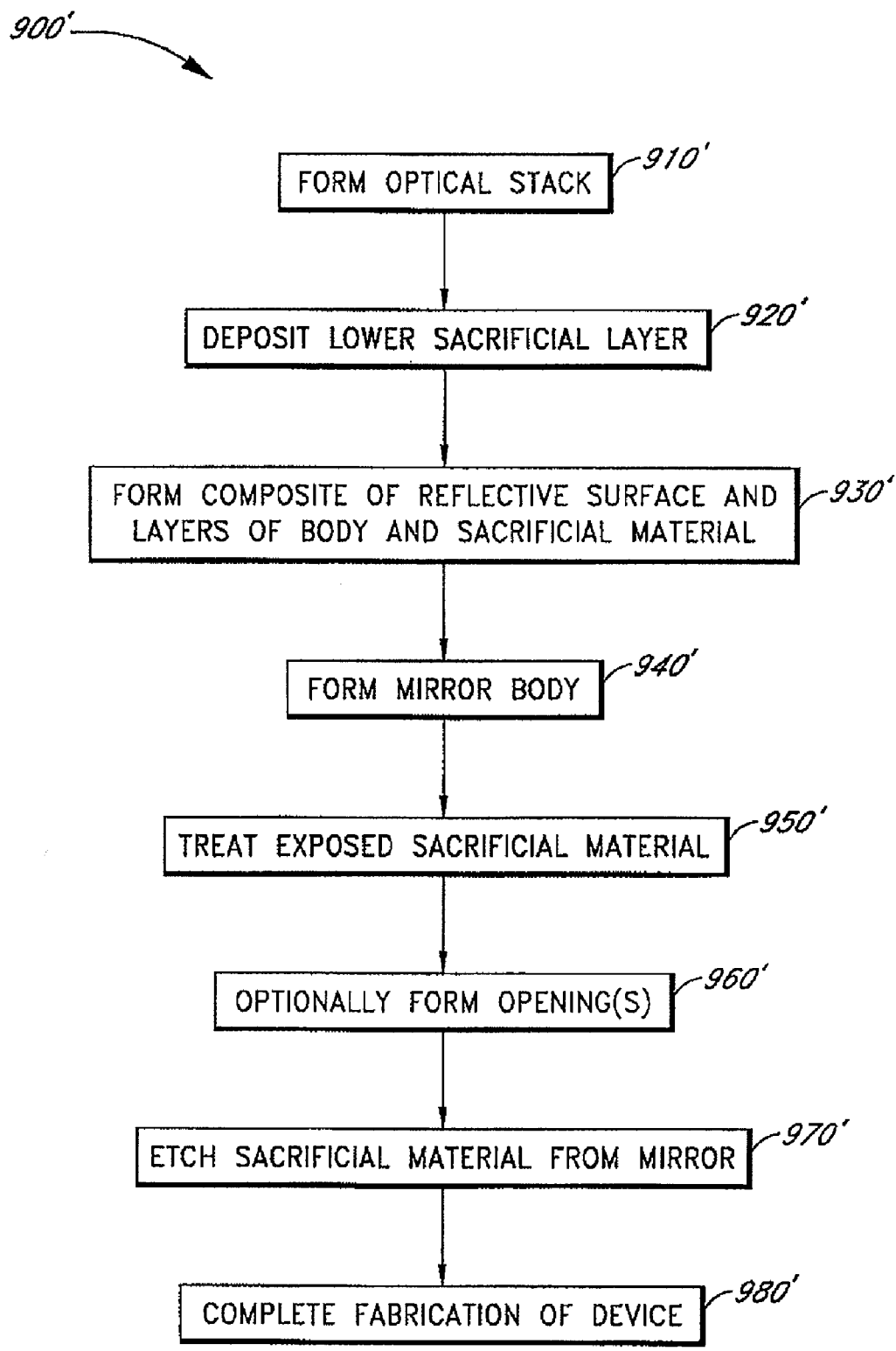

Another method for fabricating the interferometric modulator 800 illustrated in FIG. 8A is schematically illustrated as method 900' in FIG. 9B with reference to the structures illustrated in FIG. 8A, FIG. 8C, FIG. 8D, FIG. 8K, FIG. 8L, and FIG. 8G.

In step 910', an optical stack 820 is formed on a substrate 810 as described above. In step 920', a lower layer of sacrificial material 822 is deposited on the optical stack. An optional first etch stop 824 is deposited on the sacrificial material. In step 930', a composite comprising a layer 846 of a reflective material comprising a reflective surface 842, an optional second etch stop 856, and alternating layers of a body material 848 and a sacrificial material 852 are formed. The resulting structure is illustrated in FIG. 8D. In some embodiments, steps 910', 920', and 930' are substantially identical to steps 910, 920, and 930, respectively, described above.

In step 940', the device is masked, patterned, and etched to form a mirror body 844, which provides the structure illustrated in FIG. 8K. In some embodiments, step 940' is substantially similar to step 960 described above. In step 950', the exposed portions 852a of the sacrificial layers are modified and/or treated. This treatment renders the untreated portions of the sacrificial layers 852 selectively etchable compared to the treated portions 852a and the layers of body material 848. Those skilled in the art will understand that the particular treatment depends on the type of material from which the layers of sacrificial material 852 are fabricated. For example, in some embodiments, a liquid or gaseous dopant is infused into the exposed portions 852a, thereby forming a suitable treated material. Examples of suitable sacrificial material/dopant combinations include polycrystalline silicon and oxygen and/or a nitrogen source to form silicon dioxide, silicon nitride, and/or silicon oxynitride; silicon and metals to form metal silicides; polymers and crosslinking agents; polymers and fillers, such as other polymers and/or inorganic materials to form composites.

In other embodiments, the sacrificial material 852 is photochemically active. For example, in some embodiments, the sacrificial material 852 is a photoreactive polymer, for example, a photoresist. Suitably irradiating the mirror body 844 forms treated exposed portions 852a of the photoreactive polymer that are resistant to conditions suitable for etching the non-irradiated polymer, for example, developing a photoresist. As is known in the art, the type of irradiation used depends on the particular photoreactive polymer used. For example, resists are available for use with ultraviolet (UV) radiation and electron beams.

In some embodiments, the treated exposed portions 852a of the sacrificial material are porous. In some embodiments, the sacrificial material 852 is also porous. In some preferred embodiments, the porous sacrificial material is a polymer. As discussed above, the exposed portions 852a of the sacrificial material are treated to render the untreated portions selectively etchable. In some embodiments, the material is hardened, for example, thermally, chemically, photochemically, or tribologically. In other embodiments, a second polymer is used to fill the pores of the first polymer. The first polymer is selectively etchable over the second polymer. In some of these embodiments, the exposed portions 852a of the sacrificial material are no longer porous.

In optional step 960', the mirror body 844 is masked, patterned, and etched to form one or more openings 854. In some embodiments, step 960' is substantially similar to step 950 described above. The resulting structure is illustrated in FIG. 8L. In step 970', the layers of sacrificial material 852 in the mirror body are etched away under conditions in which the treated portions 852a and layers of body material 848 are not significantly etched, for example, as discussed above in step 950. The treated portions of the sacrificial material are not significantly removed in this step, thereby forming the spacers 852a in the finished device. In embodiments in which one or more openings 854 are formed in optional step 960', the etchant contacts the untreated sacrificial material through the opening(s) 854. In embodiments in which the treated portions of the sacrificial material 852a are porous, the etchant contacts the untreated sacrificial material through the pores. Accordingly, step 960' is optional in some embodiments. The resulting structure is illustrated in FIG. 8G.

In step 980', the fabrication of the interferometric modulator illustrated in FIG. 8A is completed, for example, as described above in steps 970 and 980.

Figure 10A:
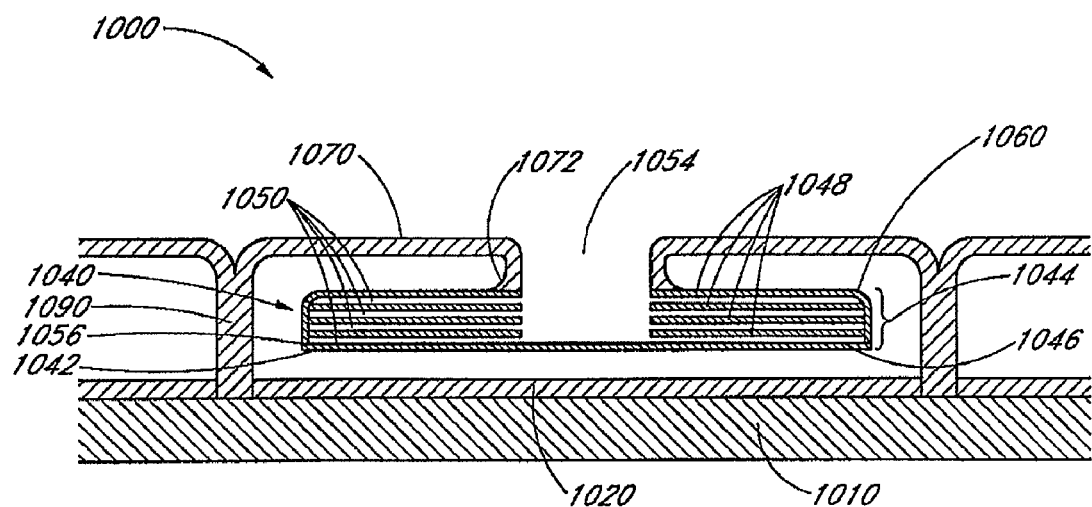
FIG. 10A and FIG. 10B illustrate in cross section embodiments of an interferometric modulator comprising a movable mirror comprising layers of a body material.

Another embodiment of an interferometric modulator comprising a layered mirror body is illustrated in cross section in FIG. 10A. The movable mirror 1040 is similar to the embodiment illustrate in FIG. 8A and described above with the addition of a shell 1060 described below. Unless otherwise specified, the materials are substantially the same as those used in the embodiment illustrated in FIG. 8A and discussed above.

The interferometric modulator 1000 comprises a substrate 1010, an optical stack 1020, a movable mirror 1040, and a mechanical layer 1070 supported by posts 1090. An annular connector 1072 secures the movable mirror 1040 to the mechanical layer 1070. In other embodiments similar to the embodiments illustrated in FIG. 7A and FIG. 7B, the movable mirror and mechanical layer share one or more layers.

The movable mirror 1040 comprises a reflective surface 1042 and a mirror body 1044. The body 1044 comprises layers 1048 of a first body material with voids or cavities 1050 circumscribed by adjacent layers 1048 of the first body material. The body 1044 further comprises a shell 1060 surrounding the layers 1048 of the first body material. In the illustrated embodiment, the shell 1060 together with a reflective layer 1046 substantially enclose the layers 1048 of the first body material. The shell 1060 secures the individual layers of the first body material 1048, thereby providing structural integrity to the movable mirror 1040. In the illustrated embodiment, the shell 1060 includes elements substantially perpendicular to the reflective surface 1042 that define the edges of the cavities 1050.

The illustrated embodiment does not comprise any remaining sacrificial material between the layers of the first body material 1048, as will become apparent from the description below. Other embodiments include some remaining sacrificial material or other spacers disposed between at least some layers of the first body material 1048. The body 1044 also comprises one or more openings 1054. In the illustrated embodiment, the body 1044 also comprises an etch stop 1056.

The shell 1060 comprises a second body material. As discussed below, in some embodiments, the second body material comprises a conformally depositable material and/or material depositable with good step coverage, for example, aluminum, aluminum alloys, aluminum oxide, silicon oxide, amorphous silicon, nickel, titanium, molybdenum, and combinations thereof. In some embodiments, at least one of the first or second body materials is selectively etchable over the other.

Figure 10B:
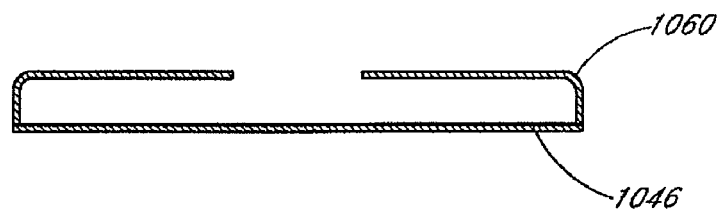
Figure 10C:
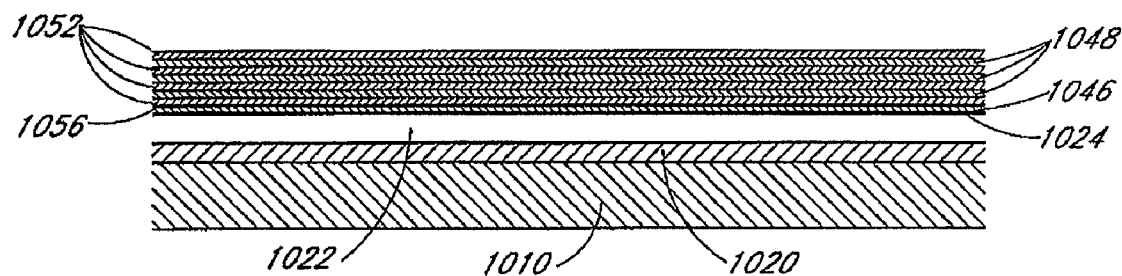
FIG. 10C-FIG. 10G illustrate intermediate structures of an embodiment of a method for fabricating the interferometric modulator illustrated in FIG. 10A.
Figure 10D:
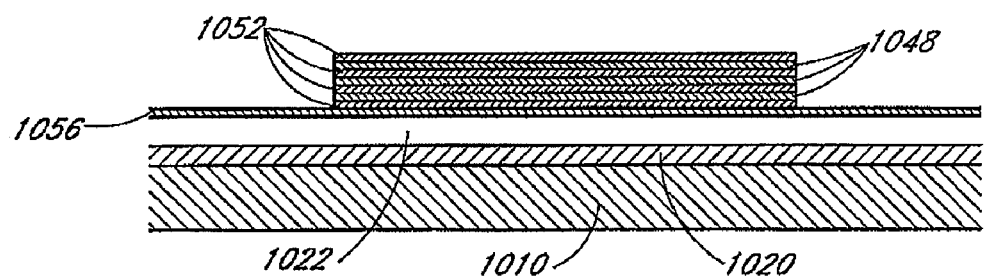
Figure 10E:
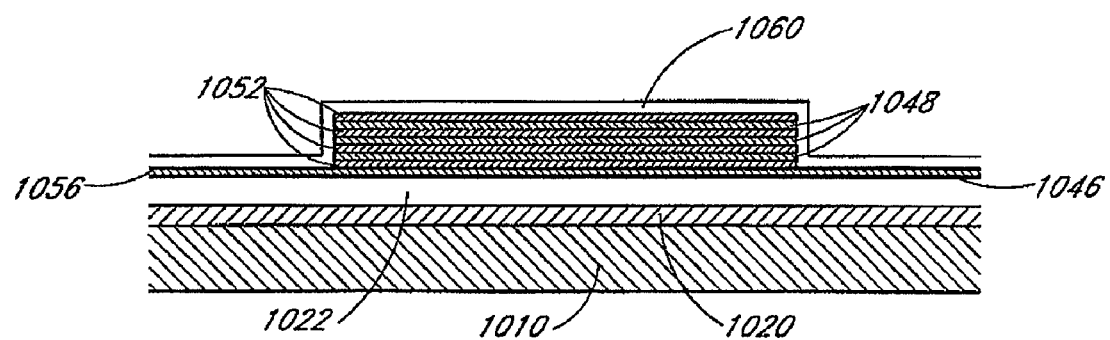

Some embodiments comprise a different number of layers 1048 of the first body material. For example, the embodiment illustrated in FIG. 10B comprises a shell 1060 and a reflective layer 1046 and no layers of a first body material.

Figure 10F:
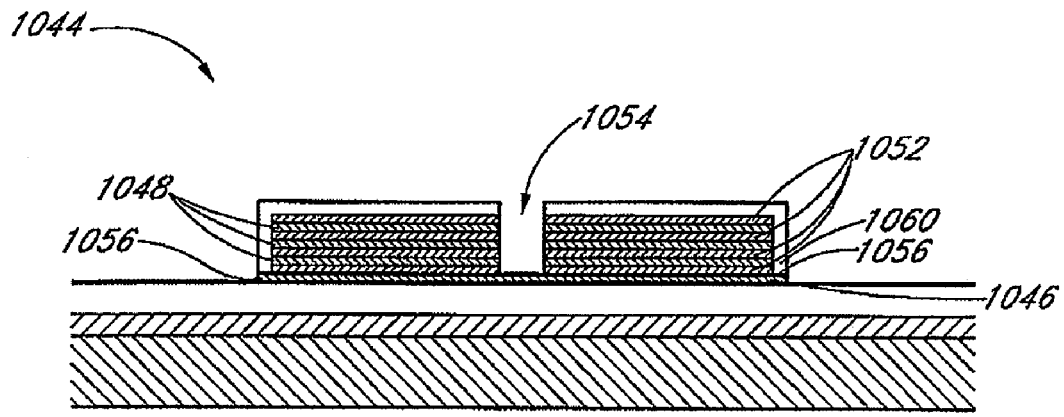
Figure 10G:
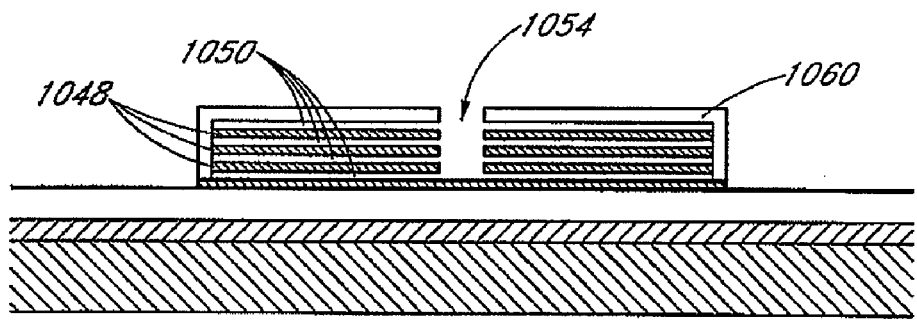
Figure 11:
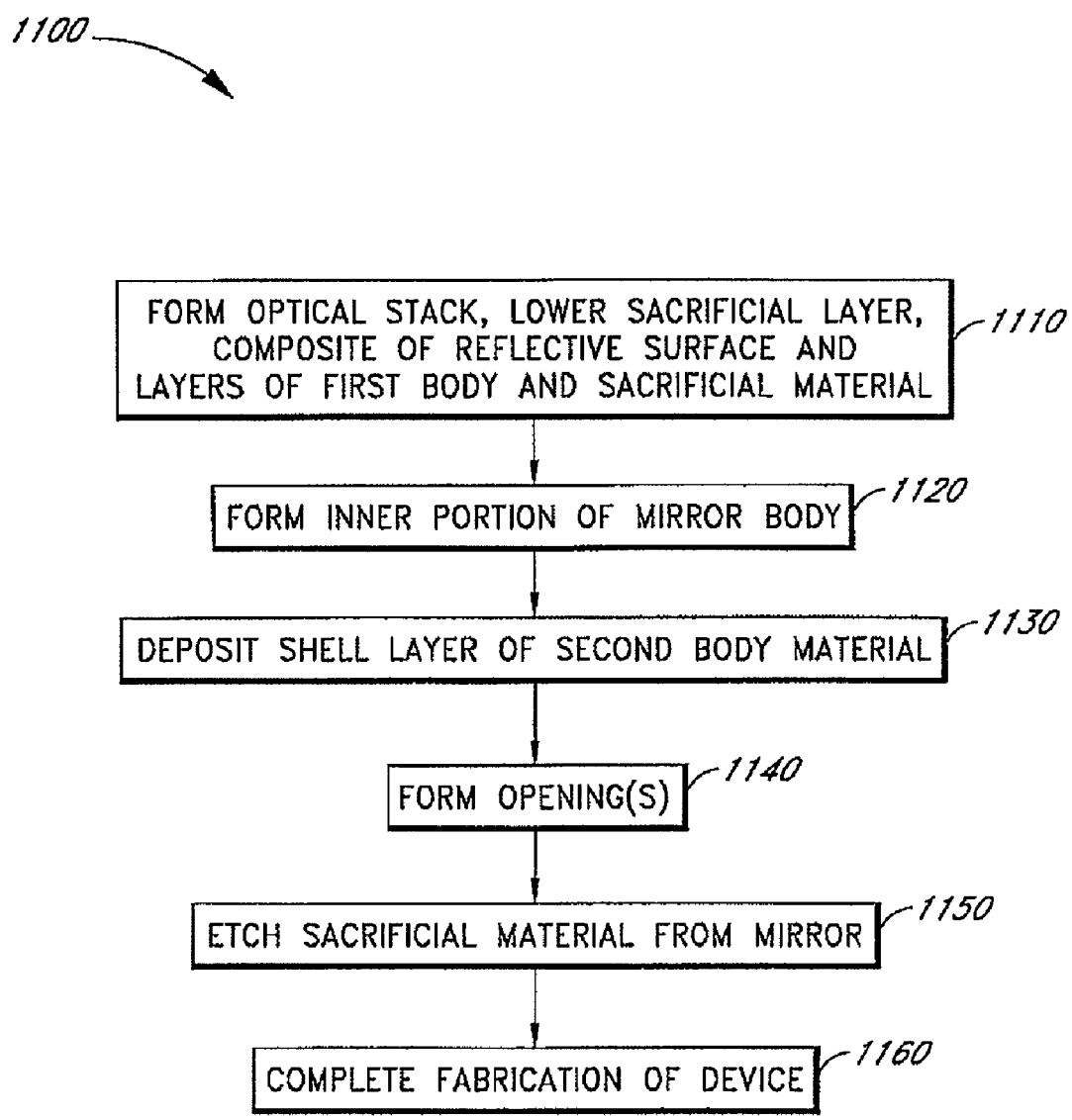
FIG. 11 schematically illustrates an embodiment of a method for fabricating the interferometric modulator illustrated in FIG. 10A.

A method for fabricating the movable mirror 1040 is illustrated schematically in FIG. 11 with reference to the structures illustrated in FIG. 10A and FIG. 10C through FIG. 10G. Step 1110 is substantially identical to steps 910-930 above. In step 1110, an optical stack 1020 is formed on a substrate 1010 as described above. A lower layer of sacrificial material 1022 and an optional first etch stop 1024 is then deposited on the optical stack 1020. A composite comprising the reflective layer 1046 and layers of body material 1048 and sacrificial material 1052 are formed as described above. The resulting structure is illustrated in FIG. 1C.

In step 1120, the structure is masked, patterned, and the reflective layer 1046, and layers of body material 1048 and sacrificial material 1052 etched to provide the structure illustrated in FIG. 10 D, which in the illustrated embodiment, forms the inner portion of the mirror body 1044. In the illustrated embodiments, the etched layers of body material 1048 and sacrificial material 1052 are smaller than the finished mirror.

In step 1130, shell layer 1060 of a second body material is conformally deposited to provide the structure illustrated in FIG. 1E. The shell layer 1060 covers the layers of the first body material 1048 and the sacrificial material 1052, and the reflective layer 1046. As described below, this layer forms the shell of the movable mirror 1040.

In step 1140, the structure is masked, patterned, and one or more openings 1054 are etched through the shell layer 1060, the shell layer 1060 is etched to conform to the mirror shape defined in step 1120, and the layers of the first body material 1048 and the sacrificial material 10 52 are etched away to form one or more openings 10 54. In the illustrated embodiment, the depth of the etch is defined by the second etch stop 1056. In the illustrated embodiment, undesired portions of the shell layer 1060 are also removed in this step, thereby forming the mirror body 1044. In other embodiments, this operation is performed in another step. The resulting structure is illustrated in FIG. 10F.

In step 1150, the layers of sacrificial material 1052 in the movable mirror 1040 are etched away to form cavities 1050. The etchant accesses the sacrificial material through opening 1054. The layers 1048 are secured to the shell 1060. The resulting structure is illustrated in FIG. 10G. In step 1160, fabrication of the interferometric modulator is completed, for example, as discussed above in steps 970-980.

Figure 12A:
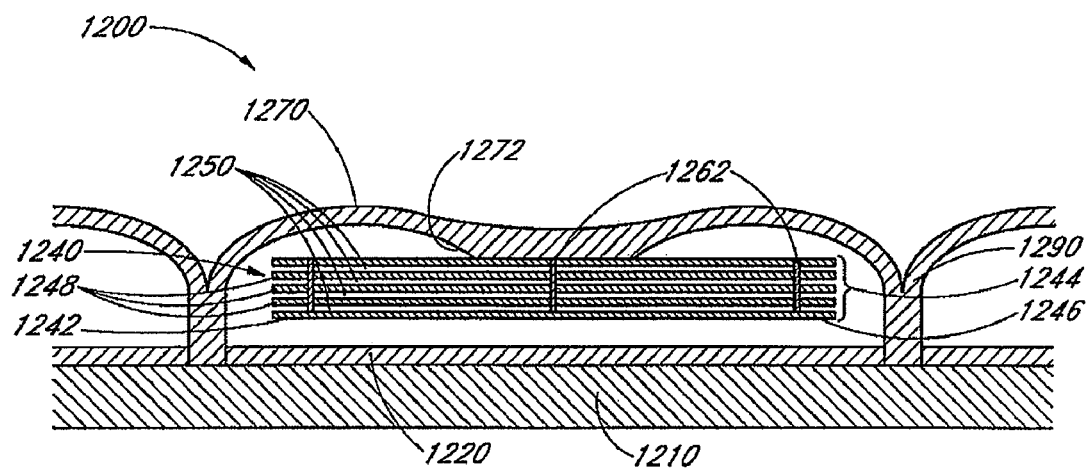
FIG. 12A illustrates in cross section an embodiment of an interferometric modulator comprising a movable mirror comprising layers of a body material.

FIG. 12A illustrates another embodiment of an interferometric modulator 1200 comprising a layered mirror body. The illustrated embodiment is similar to the embodiment illustrated in FIG. 8A with the addition of mirror pins, which are discussed in greater detail below. Unless otherwise specified, the materials can be substantially the same as those used in the embodiment illustrated in FIG. 8A.

The interferometric modulator 1200 comprises a substrate 1210, an optical stack 1220, a movable mirror 1240, and a mechanical layer 1270 supported by posts 1290. A connector 1272 secures the movable mirror 1240 to the mechanical layer 1270.

The movable mirror 1240 comprises a reflective surface 1242 and a mirror body 1244. The body 1244 comprises layers 1248 of a body material forming voids or cavities 1250 between adjacent layers 1248 of the body material. In the illustrated embodiment, the mirror body 1244 also comprises a reflective layer 1246.

Figure 12B:
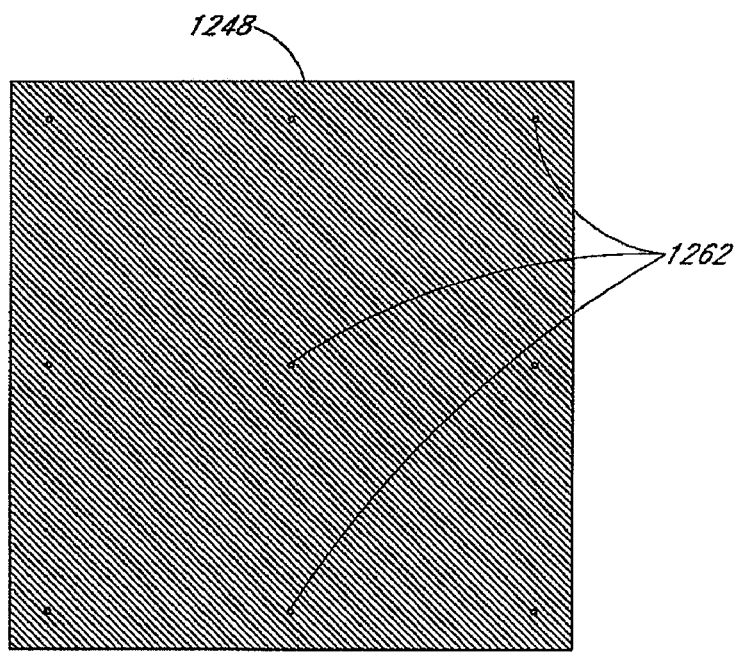
FIG. 12B-FIG. 12G illustrate intermediate structures of an embodiment of a method for fabricating the interferometric modulator illustrated in FIG. 12A.

The body 1244 further comprises a plurality of mirror pins 1262 extending vertically through the layers of the body material 1248 and contacting the reflective layer 1246. The mirror pins 1262 secure the layers 1246 and 1248, thereby providing the structural integrity to the mirror 1240. Accordingly, the layers of body material 1248 form a physical connection to the mirror pins 1262. The mirror pins 1262 are of any suitable material, for example, aluminum, aluminum alloys, aluminum oxide, silicon oxide, amorphous silicon, nickel, titanium, molybdenum, and combinations thereof. As discussed below, the particular material will depend on the method used to fabricate the movable mirror 1240. The pins 1262 are arranged in any suitable pattern, for example, in a square grid, a rectangular grid, a triangular grid, a hexagonal grid, and/or combinations thereof. In other embodiments, the pins 1262 have another arrangement, for example, a random arrangement. FIG. 12B is a top view of an embodiment of a movable mirror 1240 in which the mirror pins 1262 are arranged in a square grid. The size and spacing of the mirror pins 1262 depends on factors known in the art, for example, the mechanical properties of the mirror pins 1262, the mechanical properties of the other movable mirror 1240 components, the desired mechanical properties of the movable mirror 1240, and the like. In the illustrated embodiment, the mirror pins 1262 are substantially perpendicular to the reflective surface 1242 and extend through the cavities 1250, thereby defining portions of the cavities 1250.

Figure 12C:
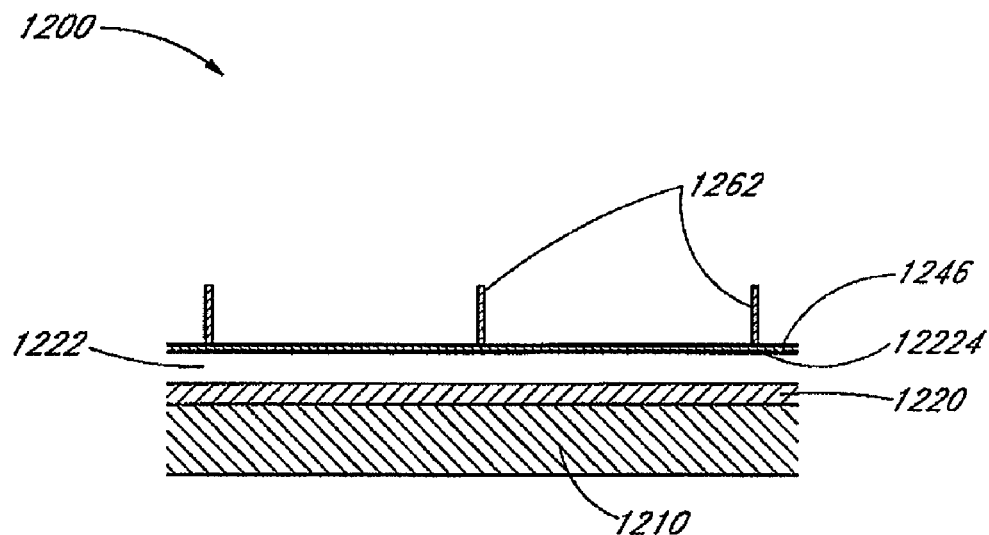
Figure 12D:
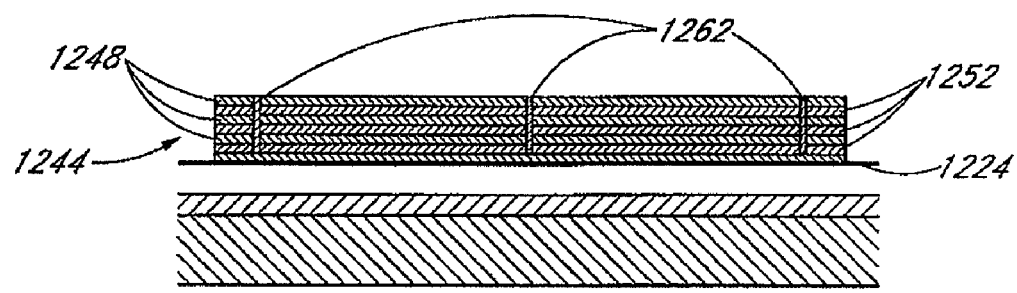
Figure 13:
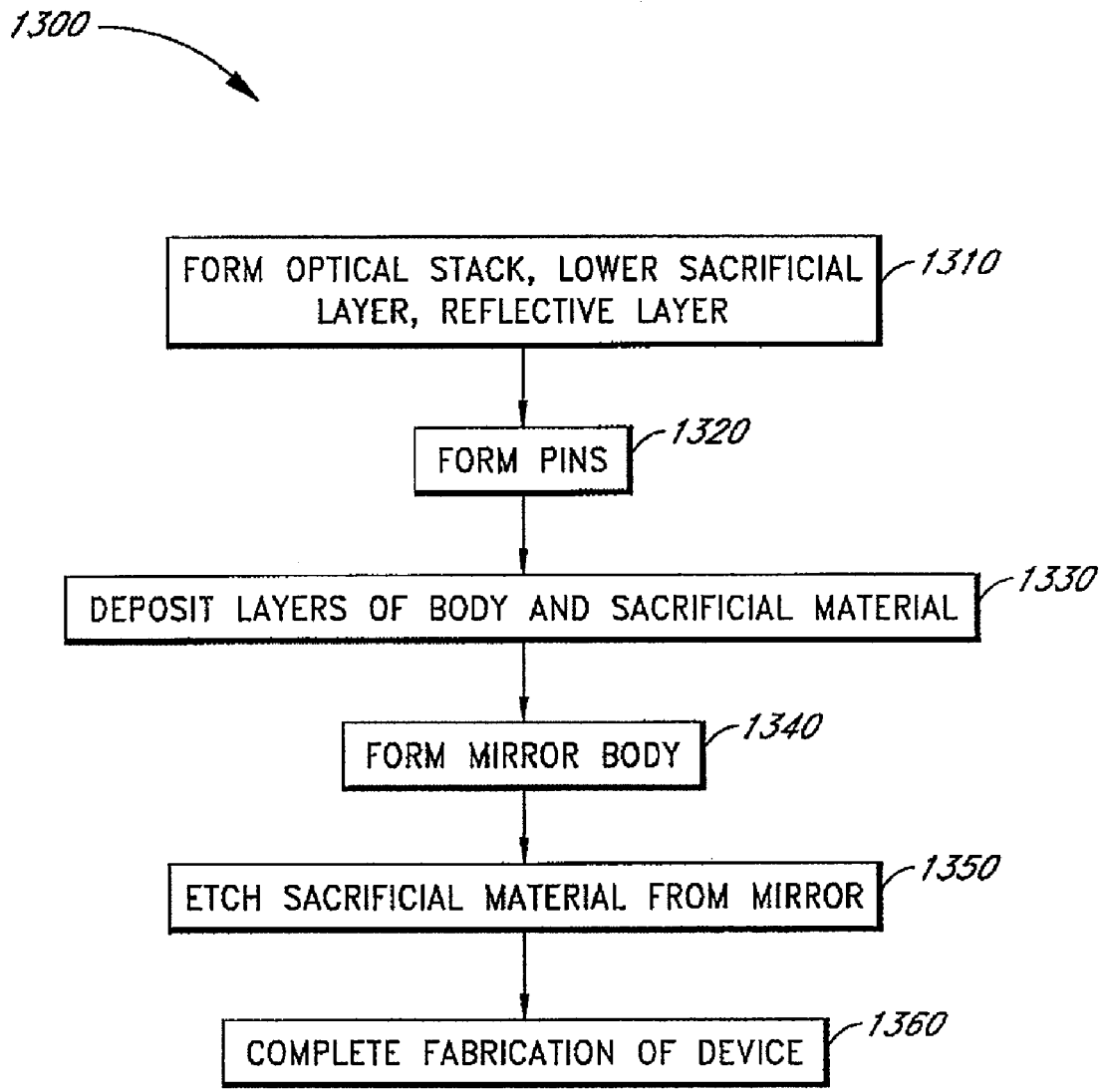
FIG. 13 schematically illustrates an embodiment of a method for fabricating the interferometric modulator illustrated in FIG. 12A.

FIG. 13 schematically illustrates a method 1300 for fabricating an interferometric modulator with reference to the structures illustrated in FIG. 12A though FIG. 12D. In step 1310, on a substrate 1210 are formed an optical stack 1220, a lower layer of a sacrificial material 1222, an optional first etch stop 1224, and a reflective layer 1246. These steps are substantially similar to the steps described above in steps 910-930. In step 1320, a suitable material is deposited, patterned, and etched to form a plurality of pins 1262, as illustrated in FIG. 12C. In step 1330, alternating layers of a body material 1248 and sacrificial material 1252 are deposited, thereby forming a composite. In step 1340, this structure is masked, patterned, and etched to form the mirror body 1244, as illustrated in FIG. 12D. In step 1350, the layers of sacrificial material 1252 in the movable mirror 1240 are etched away. In step 1360, the fabrication of the interferometric modulator 1200 is completed, for example, as described above in steps 970-980 to provide the structure illustrated in FIG. 12A. In some embodiments, the layers of sacrificial material 1252 in the movable mirror 1240 are etched away in the release etch of the movable mirror 1240.

Figure 14:
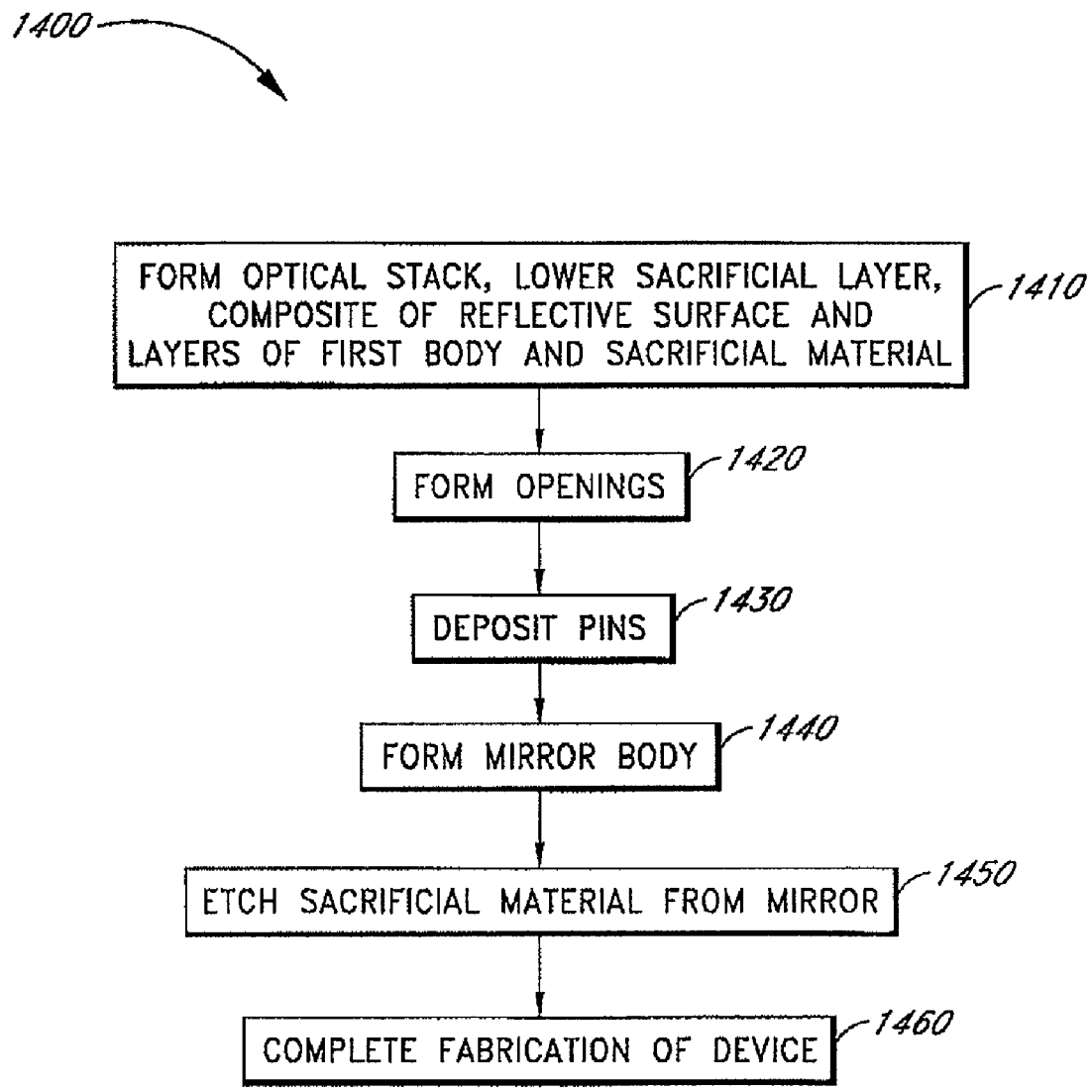
FIG. 14 schematically illustrates another embodiment of a method for fabricating the interferometric modulator illustrated in FIG. 12A.

FIG. 14 schematically illustrates another embodiment 1400 of a method for fabricating the embodiment of an interferometric modulator illustrated in FIG. 12A, with reference to FIG. 12A and FIG. 12E-FIG. 12G. In step 1410, on a substrate 1210 are formed an optical stack 1220, a lower layer of a sacrificial material 1222, an optional first etch stop 1224, a reflective layer 1246, an optional second etch stop 1256, and alternating layers of a body material 1248 and sacrificial material 1252.

Figure 12E:
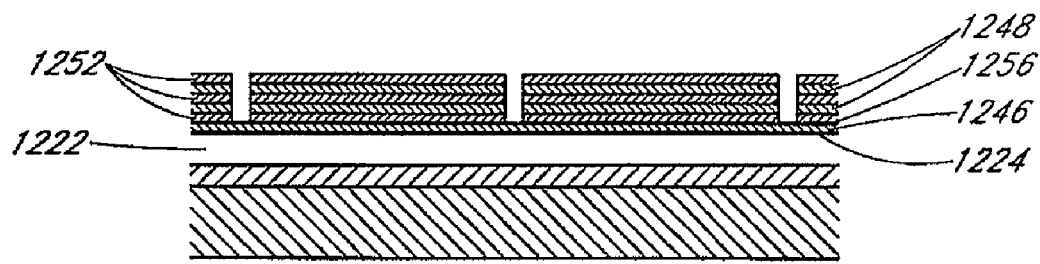
Figure 12F:
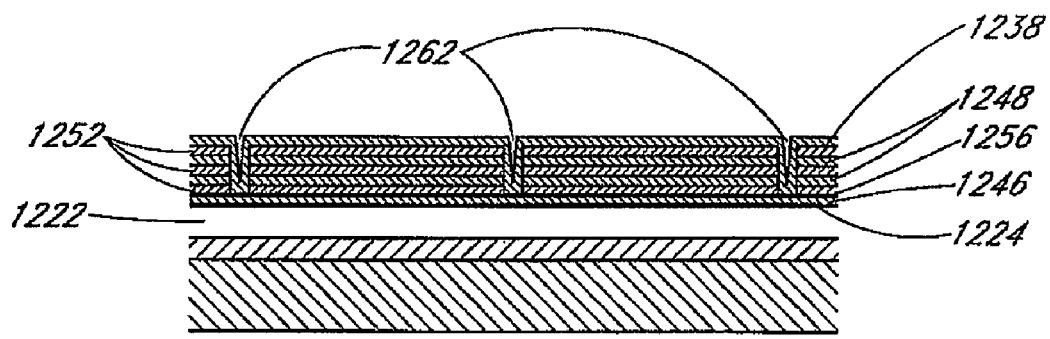

In step 1420, openings 1254 are formed by masking, patterning, and etching through the layers of body material 1248 and sacrificial material 1252 to provide the structure illustrated in FIG. 12E. In the illustrated embodiment, a second etch stop 1256 controls the depth of the openings 1254. In step 1430, mirror pins 1262 are then formed in the resulting openings 1254, for example, by depositing a layer 1238 of a suitable material, to provide the structure illustrated in FIG. 12F. In some embodiments, the mirror pins 1262 are sputtered aluminum or aluminum alloy.

In other embodiments in step 1420, the mirror pins 1262 are formed in openings 1254 using a selective deposition method. In some embodiments, the mirror pins 1262 are formed by electrochemical deposition in the openings 1254 illustrated in FIG. 12E. In some embodiments, the mirror pins 1262 substantially fill the openings 1254. In some embodiments, the electrochemical deposition is an anodic deposition, for example, of a metal oxide (e.g., aluminum, copper, manganese, magnesium, and alloys thereof). In some embodiments, the anodic film is a polymer film, for example, polypyrrole. In other embodiments, the electrochemical deposition is an electroplating step, for example, of a metal. The metal is any suitable metal, including chromium, rhodium, nickel, palladium, copper, silver, gold, zinc, tin, and mixtures thereof. In other embodiments, the mirror pins 1262 are formed by electroless deposition.

In other embodiments, the selective deposition is another process, for example, a selective chemical vapor deposition (CVD) process known in the art. Some embodiments include the deposition of a starter layer for the selective CVD process.

In some embodiments, an upper mirror layer (not illustrated) is deposited over the mirror pins 1262 and topmost layer of the alternating body material 1248 and sacrificial material 1252.

Figure 12G:
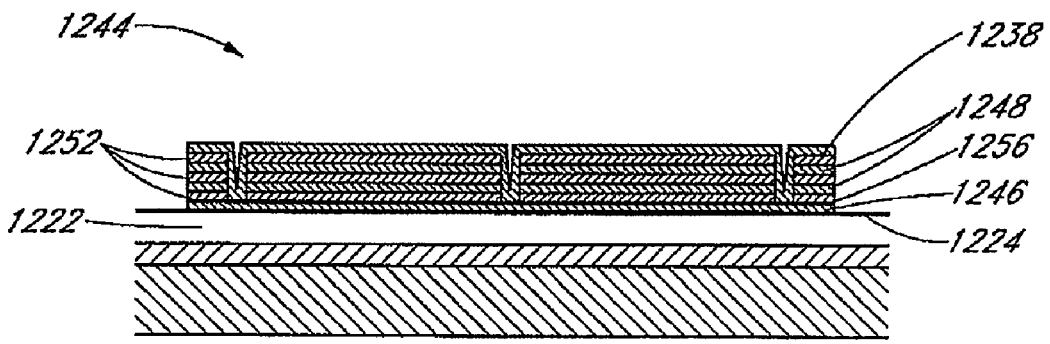

In step 1440, the mirror body 1244 is formed by masking, patterning, and etching the layer 1238 of pin material, the layers of body material 1248 and sacrificial material 1252, and the reflective layer 1246 to provide the structure illustrated in FIG. 12G. In step 1450, the layers of sacrificial material 1252 in the movable mirror 1244 are etched away. In the illustrated embodiment, the etchant accesses to the sacrificial material from the sides of the mirror body 1244. In other embodiments, one or more optional holes or openings are provided that improve the access of the etchant, and consequently, reduce the etch time. An example of such an opening is illustrated in FIG. 8E as opening 854. In step 1460, the fabrication of the interferometric modulator 1200 is completed, for example, using steps 970-980 as described above to provide the structure illustrated in FIG. 12A. In some embodiments, the layers of sacrificial material 1252 in the movable mirror 1244 are etched away in the release etch of the movable mirror 1240.

In other embodiments, at least some of the mirror pins 1262 are integrally formed with the mechanical layer 1270. In some of these embodiments, at least some of the mirror pins 1262 also serve as the connector between the movable mirror 1240 and the mechanical layer 1270.

Figure 15A:
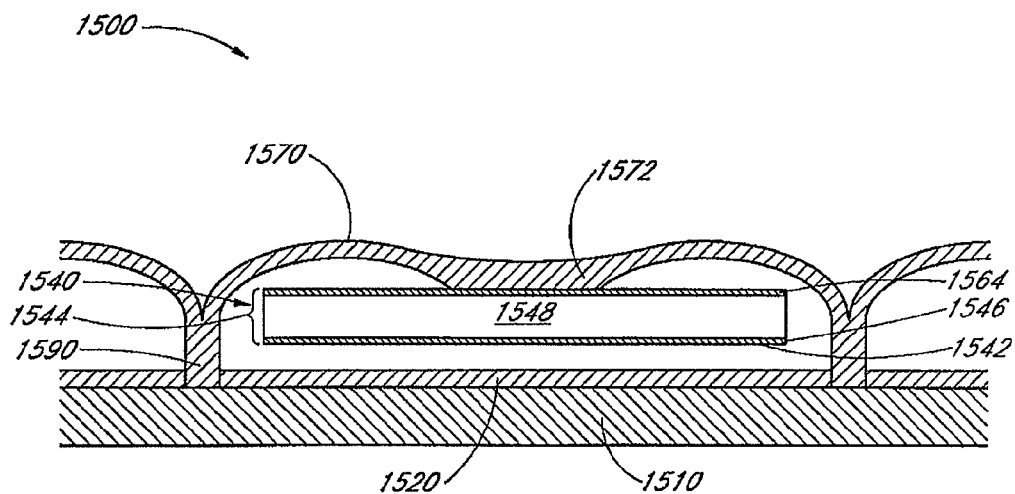
FIG. 15A illustrates in cross section an embodiment of an interferometric modulator comprising a movable mirror comprising a porous body material.

FIG. 15A illustrates an embodiment of an interferometric modulator comprising a porous mirror body in which the voids or cavities are substantially random. Unless otherwise specified, the materials are substantially the same as those used in embodiment 800.

The interferometric modulator 1500 comprises a substrate 1510, an optical stack 1520, a movable mirror 1540, and a mechanical layer 1570 supported by posts 1590. A connector 1572 secures the movable mirror 1540 to the mechanical layer 1570. The movable mirror 1540 comprises a reflective surface 1542 and a mirror body 1544. The mirror body 1544 comprises a layer 1548 of a porous body material disposed between a reflective layer 1546 and an upper mirror layer 1564. Some embodiments do not comprise an upper mirror layer. The upper mirror layer 1564 is any suitable material, for example, aluminum, aluminum alloys, chromium, copper, germanium, gold, nickel, silicon, silver, tin, titanium, zinc, silicon dioxide, aluminum oxide, and mixtures and/or alloys thereof. Some embodiments of the movable mirror 1540 do not comprise an upper mirror layer.

Figure 15B:
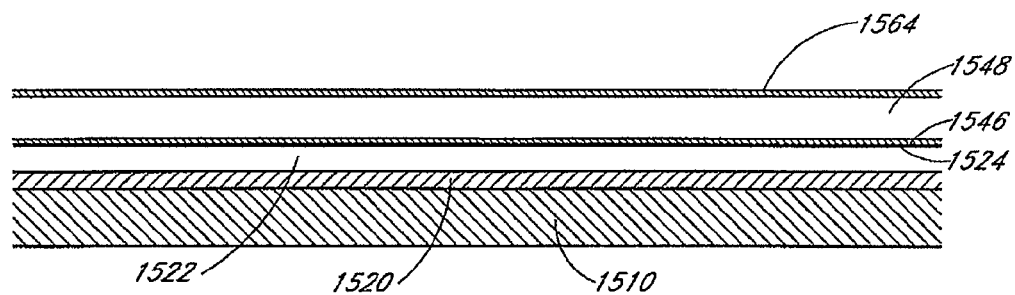
FIG. 15B-FIG. 15H illustrate intermediate structures of some embodiments of a method for fabricating the interferometric modulator illustrated in FIG. 15A.
Figure 15C:
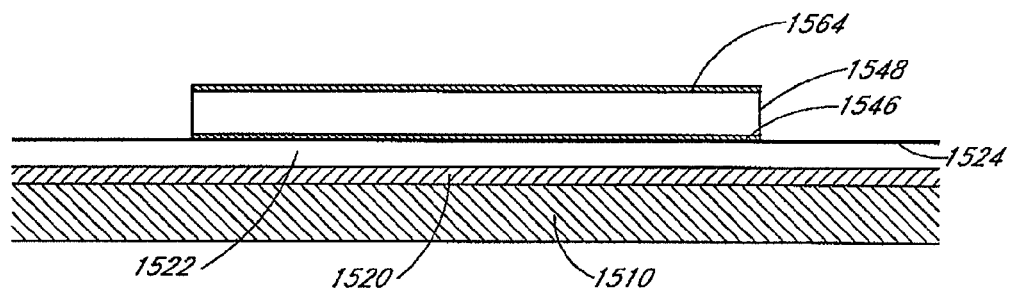
Figure 15D:
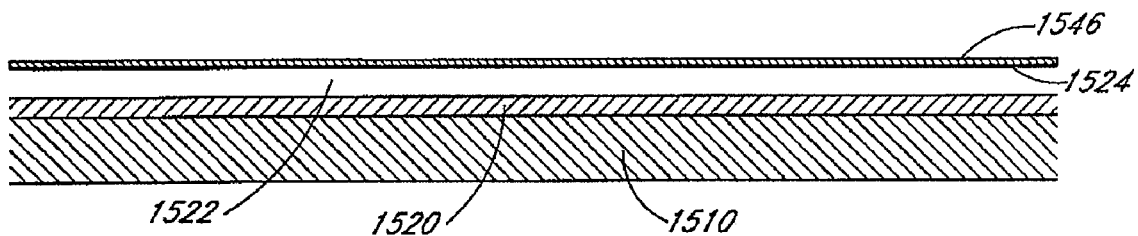
Figure 15E:
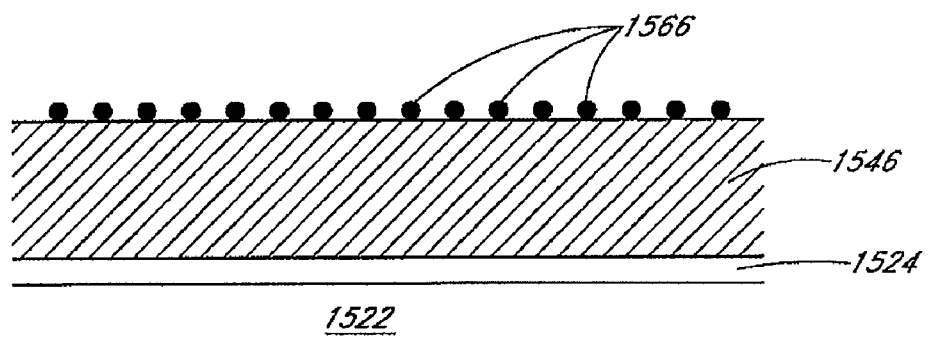
Figure 15F:
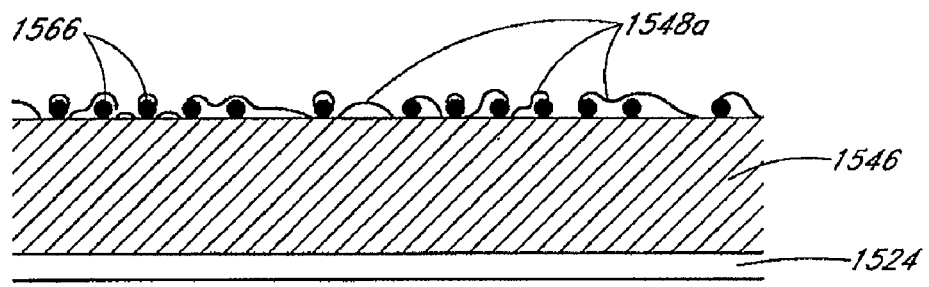
Figure 15G:
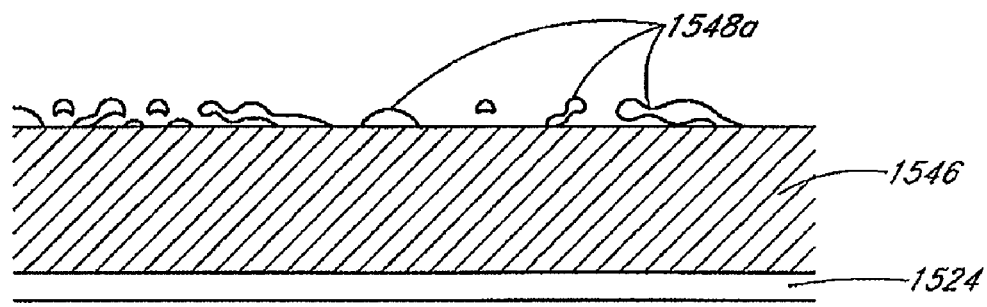
Figure 15H:
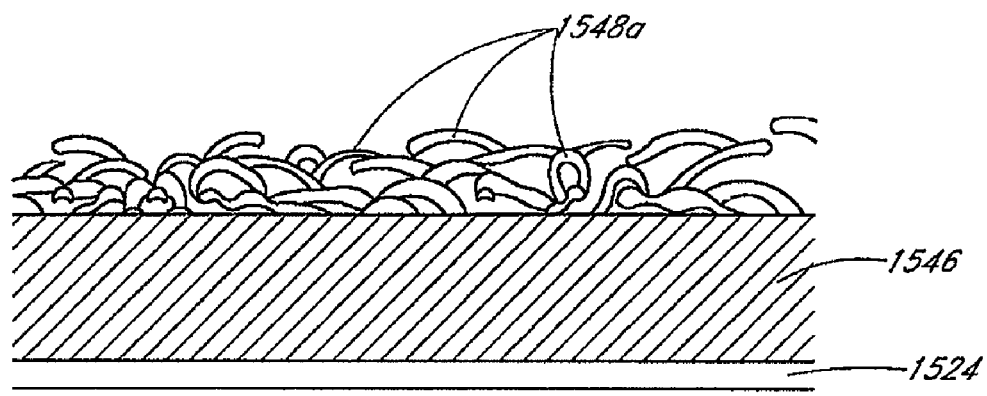
Figure 16:
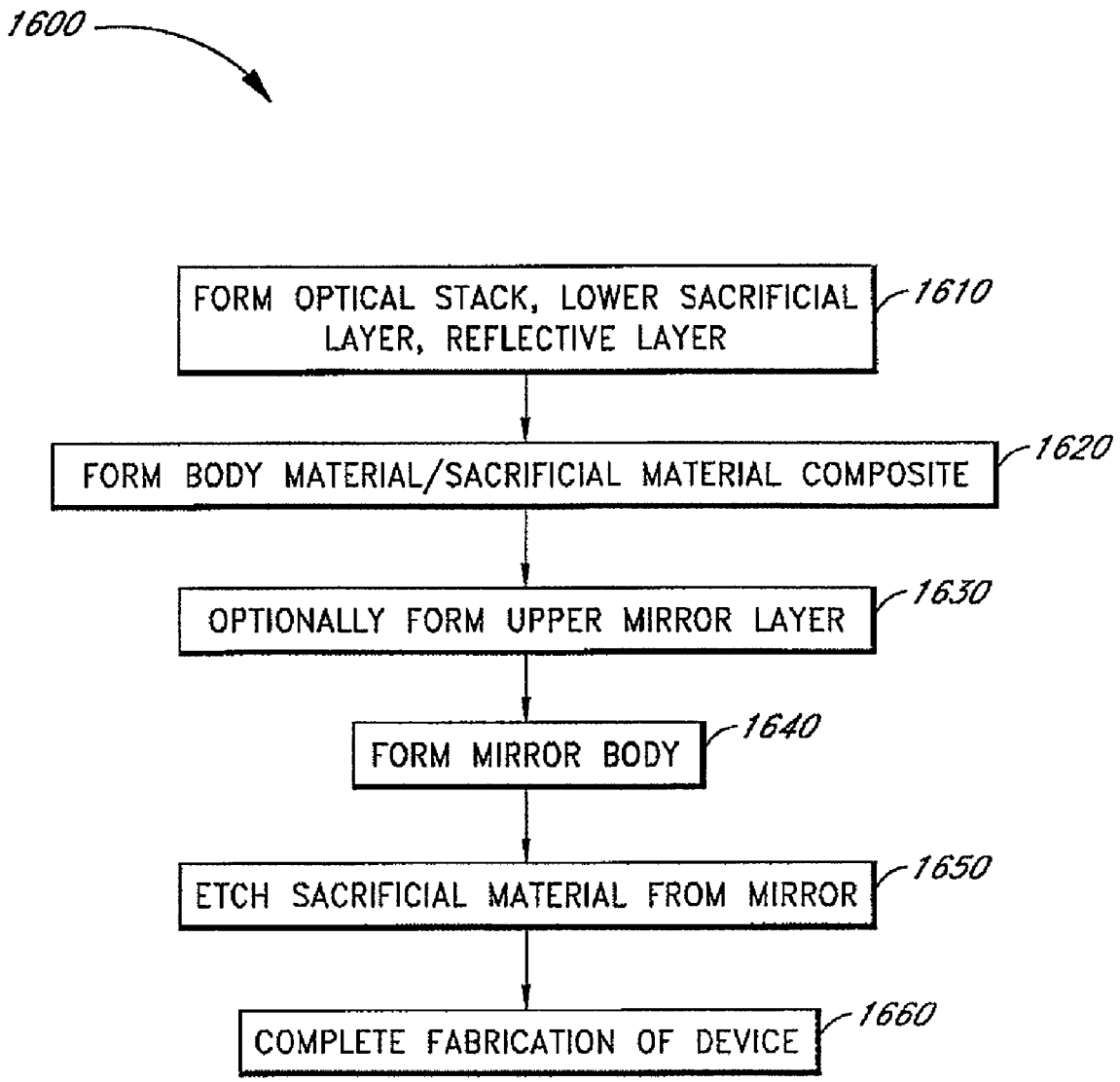
FIG. 16 schematically illustrates an embodiment of a method for fabricating the interferometric modulator illustrated in FIG. 15A.

FIG. 16 is a schematic illustrating an embodiment 1600 of a method for fabricating an embodiment of the interferometric modulator illustrated in FIG. 15A, with reference to FIG. 15A through FIG. 15H. In step 1610, on a substrate 1510 are formed an optical stack 1520, a lower sacrificial layer 1522, an optional etch stop 1524, and a reflective layer 1546. These steps are substantially as described above in steps 910-930. In step 1620, a layer 1548 comprising both a body material and a sacrificial material is formed.

In some embodiments, the layer 1548 comprises a composite or mixture of a body material and a sacrificial material at or above the percolation threshold of the body material. At the percolation threshold of the body material, the body material forms a substantially continuous network throughout the layer 1548. The precise value for the percolation threshold will depend on the identities of the materials, but is typically from about 30 mol % to about 40 mol %. In some preferred embodiments, the sacrificial material is also at or above the percolation threshold, which provides a material containing substantially no isolated pockets of the sacrificial material. The mixture of the body material and sacrificial material is formed by any means known in the art, for example, by physical vapor deposition (PVD), sputtering, chemical vapor deposition (CVD), electrochemically, and the like. In some embodiments, the mixture is deposited by sputtering. In some embodiments, the body material is aluminum and the sacrificial material is molybdenum.

In step 1630, an optional upper mirror layer 1564 is formed. The resulting structure is illustrated in FIG. 15B. In step 1640, resulting structure is masked, patterned, and the upper mirror layer 1564, layer 1548 of body material and sacrificial material, and reflective layer 1546 are etched to form the mirror body 1544. The resulting structure is illustrated in FIG. 15C. In step 1650, the sacrificial material is etched from the layer 1548 of the mirror body 1544. The resulting layer 1544 substantially contains only body material. In some embodiments, the sacrificial material is etched at an earlier or later stage in the process, for example, prior to forming the upper mirror layer 1564 or in the release etch of the movable mirror 1540. In step 1660, the fabrication of the interferometric modulator 1500 is completed, for example, as described above in steps 870-880.

Figure 17:
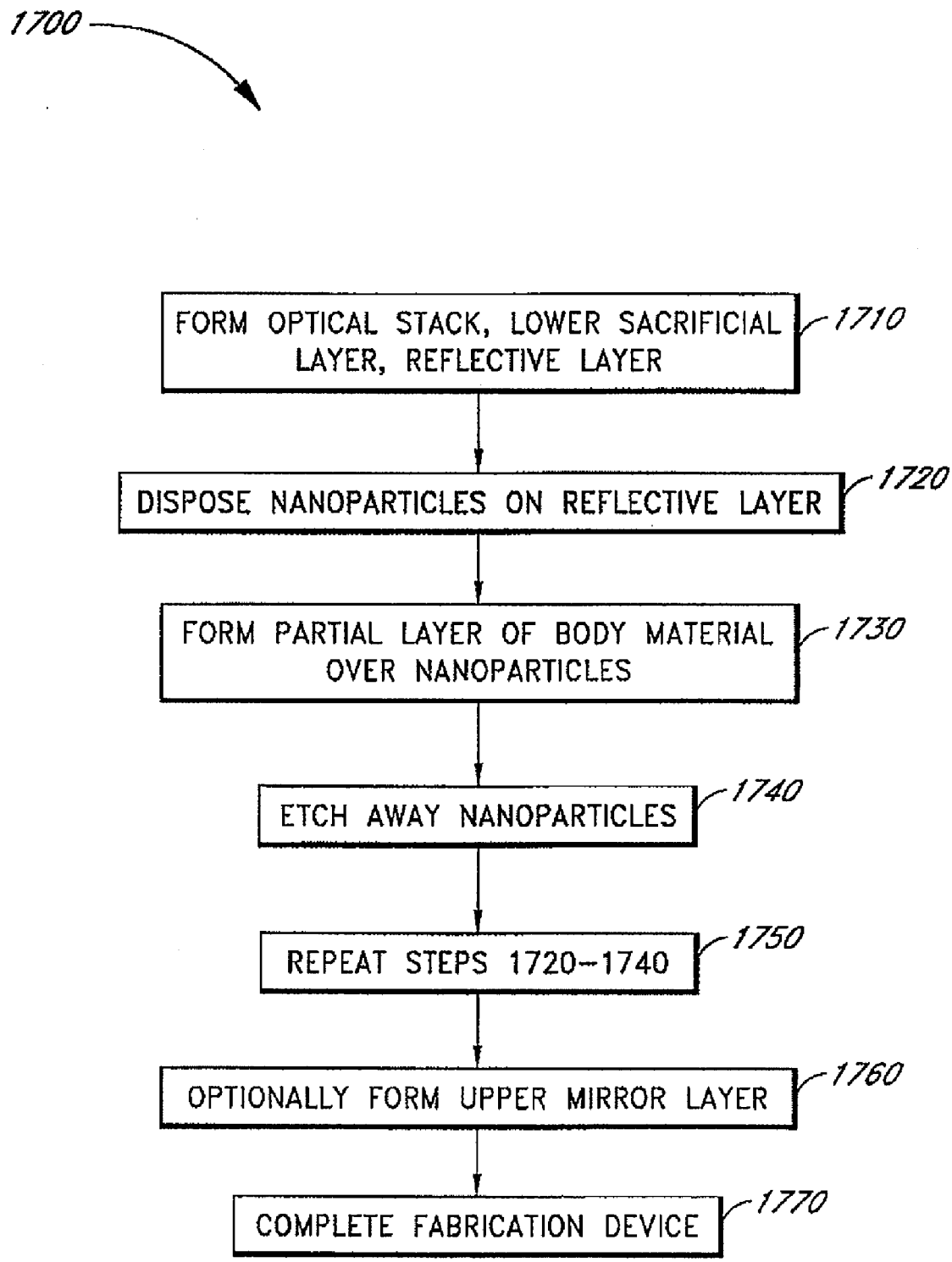
FIG. 17 schematically illustrates another embodiment of a method for fabricating the interferometric modulator illustrated in FIG. 15A.

FIG. 17 is a schematic illustrating another embodiment of a method 1700 for fabricating the device illustrate in FIG. 15A, with reference to FIG. 15A, FIG. 15C, and FIG. 15D through FIG. 15H. Step 1710 is substantially identical to step 1610 for forming the structure up to the reflective layer 1546, illustrated in FIG. 15D. In step 1720, nanoparticles 1566 are disposed on the reflective layer 1546 as illustrated in FIG. 15E in a magnified view. The nanoparticles 1566 are an etchable material, for example, ceramic, molybdenum. In some embodiments, the nanoparticles 1566 are nanospheres. In some embodiments, the nanospheres are hollow. In some embodiments, the nanoparticles are from about 50 nm to about 500 nm in diameter. In some embodiments, the diameters of the nanoparticles fall within a range, for example, from about 50 nm to about 100 nm, from about 100 nm to about 250 nm, or from about 250 nm to about 500 nm. In other embodiments, the nanoparticles have substantially the same diameter. In step 1730, a partial layer 1548a of a body material is formed on the nanoparticles 1566 using any method known in the art, for example, by PVD, sputtering, CVD, and the like. The resulting structure is illustrated in FIG. 15F. In step 1740, the nanoparticles 1566 are etched away, leaving the partial layer 1548a and providing the structure illustrated in FIG. 15G. In step 1750, steps 1720-1740 are repeated, thereby building up partial layers 1548a, as illustrated in FIG. 15H, to provide the porous layer 1578 illustrated in FIG. 15B with the desired thickness. In step 1760, an optional upper mirror layer 1564 is deposited, and the structure masked, patterned, and etched to form a mirror body 1544, illustrated in FIG. 15C. In step 1770, the fabrication of the interferometric modulator 1500 is completed, for example, as described above in steps 970-980. In some embodiments, the nanoparticles 1566 are hollow nanospheres and are not etched away.

Figure 18:
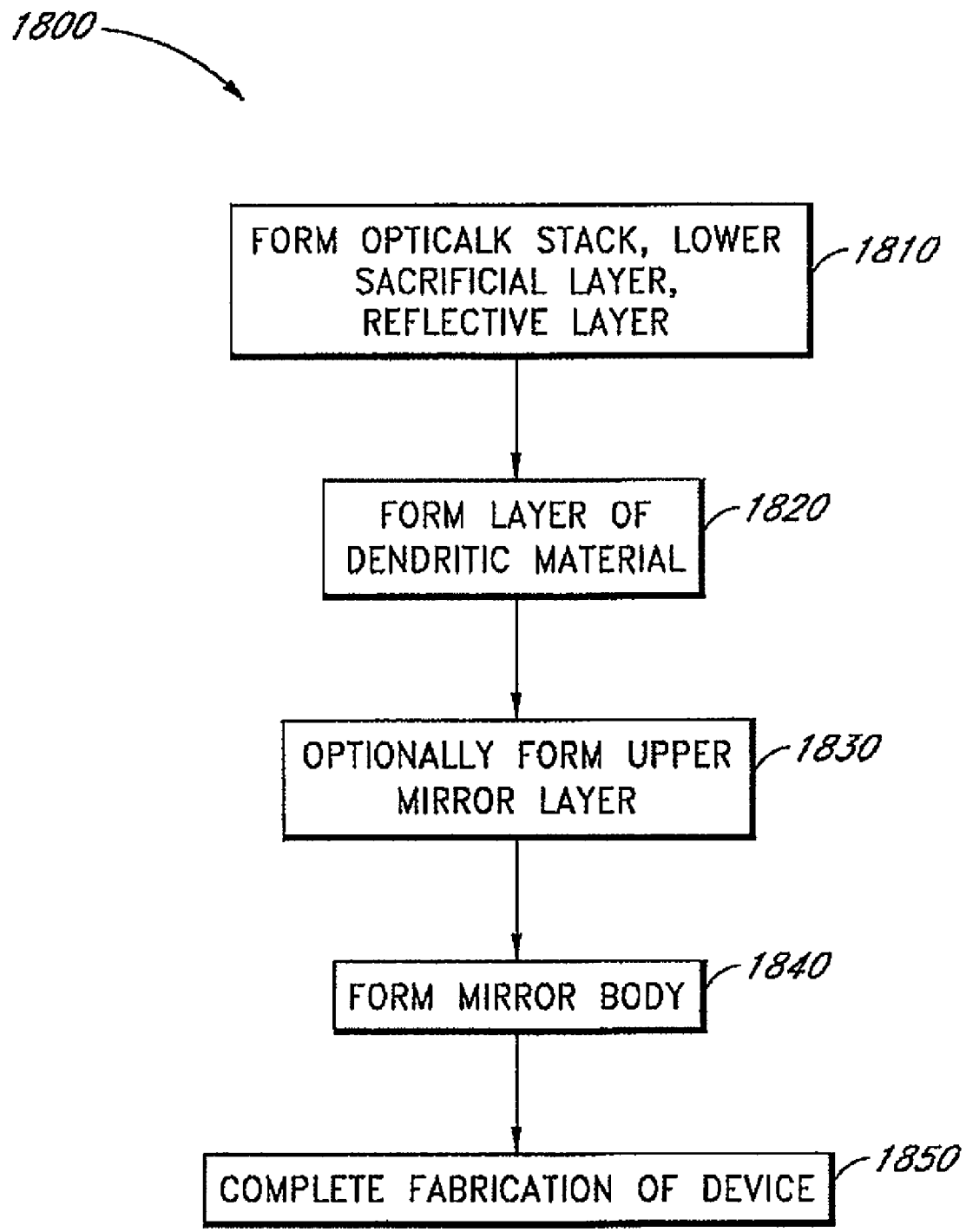
FIG. 18 schematically illustrates another embodiment of a method for fabricating the interferometric modulator illustrated in FIG. 15A.

FIG. 18 schematically illustrates another embodiment 1800 of a method for fabricating the device illustrate in FIG. 15A, with reference to FIG. 15A through FIG. 15C. Step 1810 is substantially identical to step 1610 for forming the structure up to the reflective layer 1546. In step 1820, a layer 1548 of a dendritic material is formed on the reflective layer 1546. In step 1830, an upper mirror layer 1564 is optionally deposited on the layer 1548 of dendritic material. The resulting structure is illustrated in FIG. 15B. The dendritic material is formed by methods known in the art, for example, by oblique-angle sputtering. An exemplary method is described in Jeffrey B. Sampsell, *Electronic Displays and Information Systems, Proceeding P*-92, Society of Automotive Engineers, 1, (1981). In some embodiments, the target and source are in relative motion during the deposition, for example, by rotating the target. Typically, the materials deposited using these methods are electrical insulators or oxides. In other embodiments, the dendritic material comprises striated layers formed, for example, using vacuum deposition methods known in the art, e.g., of the type used in forming alignment layers for liquid crystal displays. Another method forms layers of dendritic polymer microcrystals by sputter-etching, for example, as disclosed in U.S. Pat. No. 4,568,598.

In step 1840, the upper mirror layer 1564, layer 1548 of a body material and a sacrificial material, and reflective layer 1546 are masked, patterned, and etched to form the mirror body 1544. The resulting structure is illustrated in FIG. 15C. In step 1850, the fabrication of the interferometric modulator 1500 is completed, for example, as described above in steps 970-980.

Figure 19A:
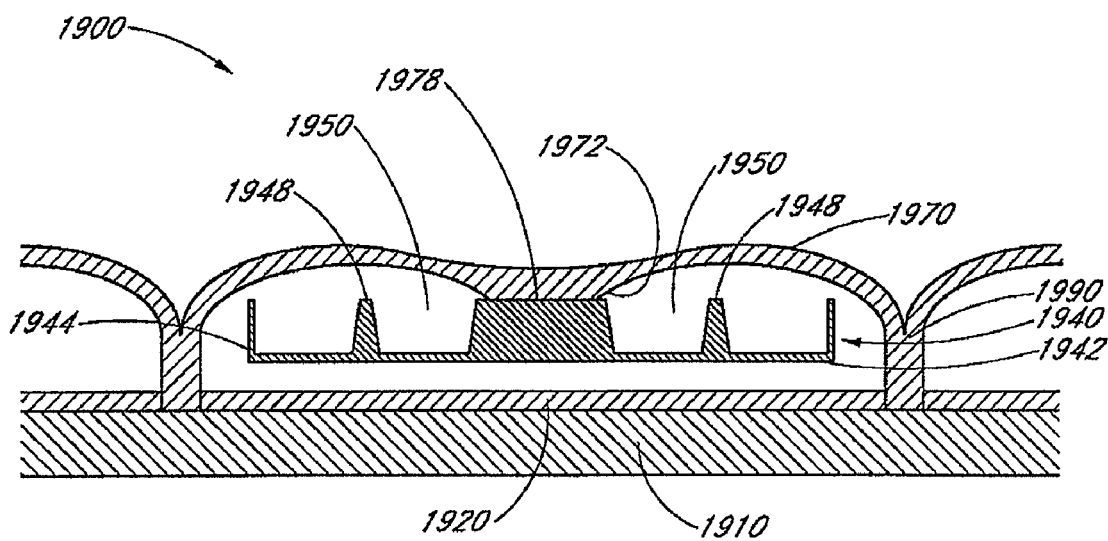
FIG. 19A illustrates in cross section an embodiment of an interferometric modulator comprising a movable mirror comprising voids formed by a structure that is substantially perpendicular to the reflective surface.

FIG. 19A illustrates in cross section an embodiment of an interferometric modulator comprising a movable mirror, in which the mirror body comprises cavities and/or voids circumscribed by a structure or structures comprising surfaces substantially perpendicular to the reflective surface. Unless otherwise specified, the materials are substantially the same as those used in embodiment 800.

The interferometric modulator 1800 comprises a substrate 1810, an optical stack 1820, a movable mirror 1840, and a mechanical layer 1870 supported by posts 1890. A connector 1872 secures the movable mirror 1840 to the mechanical layer 1870. The movable mirror 1840 comprises a reflective surface 1842 and a mirror body 1844. The body 1844 comprises one or more structures 1848 comprising a body material forming one or more voids or cavities 1850 in the mirror body 1844. The illustrated embodiment does not comprise a separate reflective layer. In other embodiments, the reflective surface 1842 is formed by a separate reflective layer. In the illustrated embodiment, the structure 1848 comprises elements substantially perpendicular to the reflective surface 1842 that define the sides of the cavities 1850.

Figure 19B:
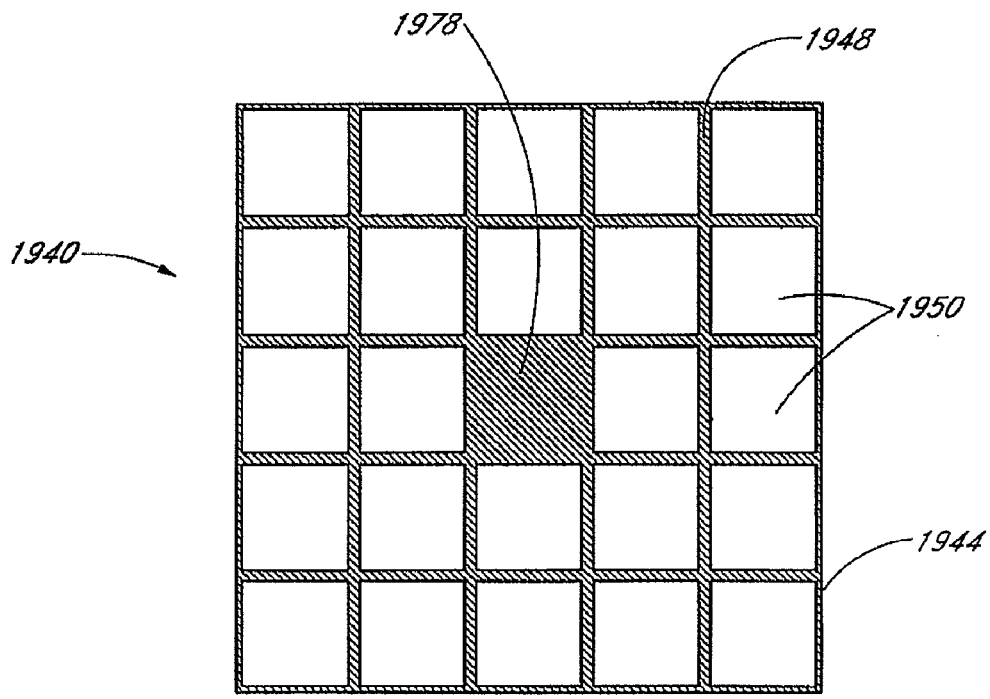
FIG. 19B-FIG. 19D are top views of embodiments of a movable mirror comprising voids formed by a structure that is substantially perpendicular to the reflective surface.

In some embodiments, the body material 1848 and cavities 1850 form a predetermined pattern. For example, FIG. 19B is a top view of an embodiment of the movable mirror 1840 in which the structure of the body material 1848 and cavities 1850 form a substantially a square grid. The illustrated embodiment includes a connector contact area 1878 substantially at the center of the mirror body 1844 to which the connector 1872 is secured. Other embodiments comprise a plurality of connector contact areas, or no connector contact areas.

Figure 19C:
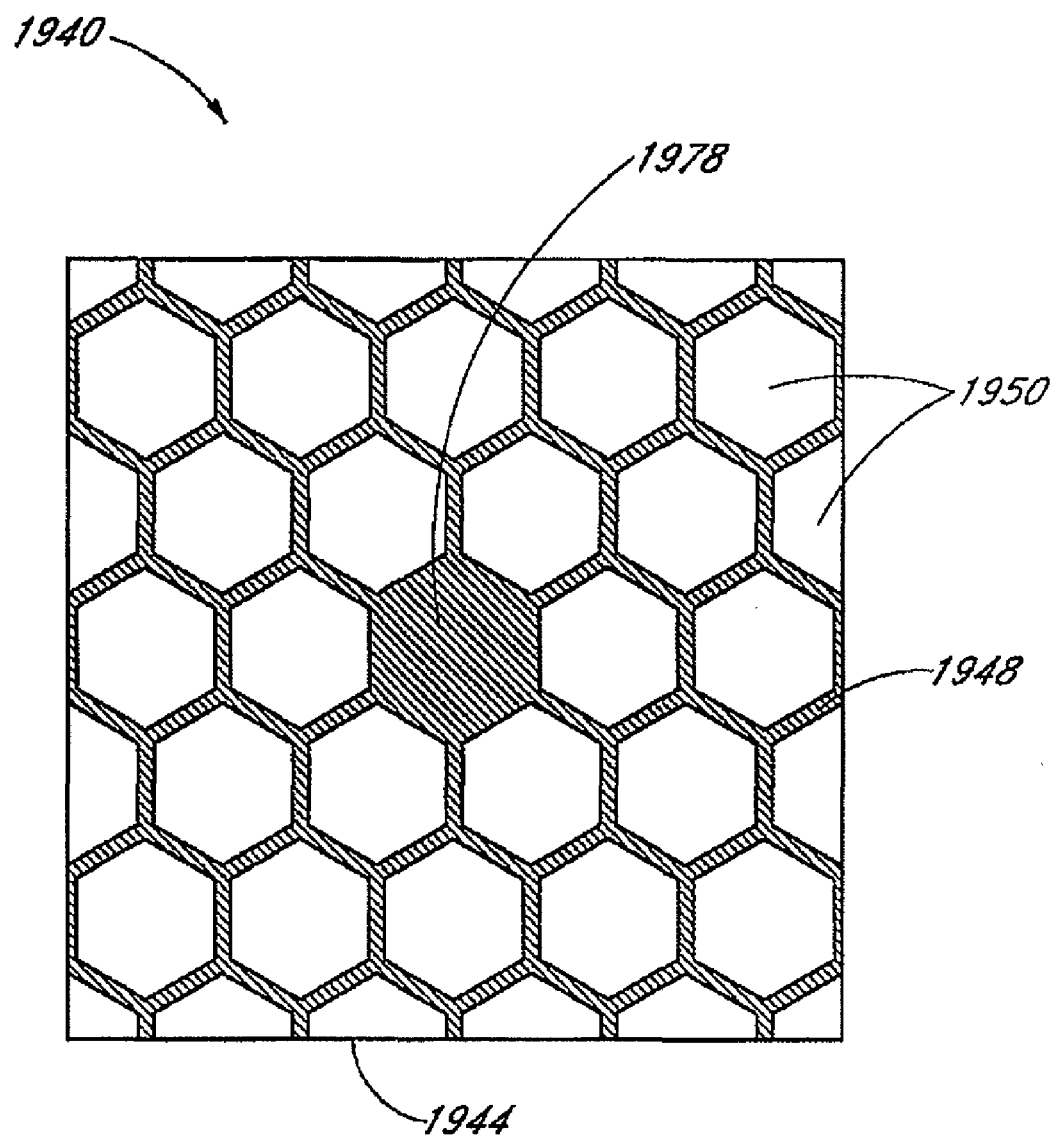
Figure 19D:
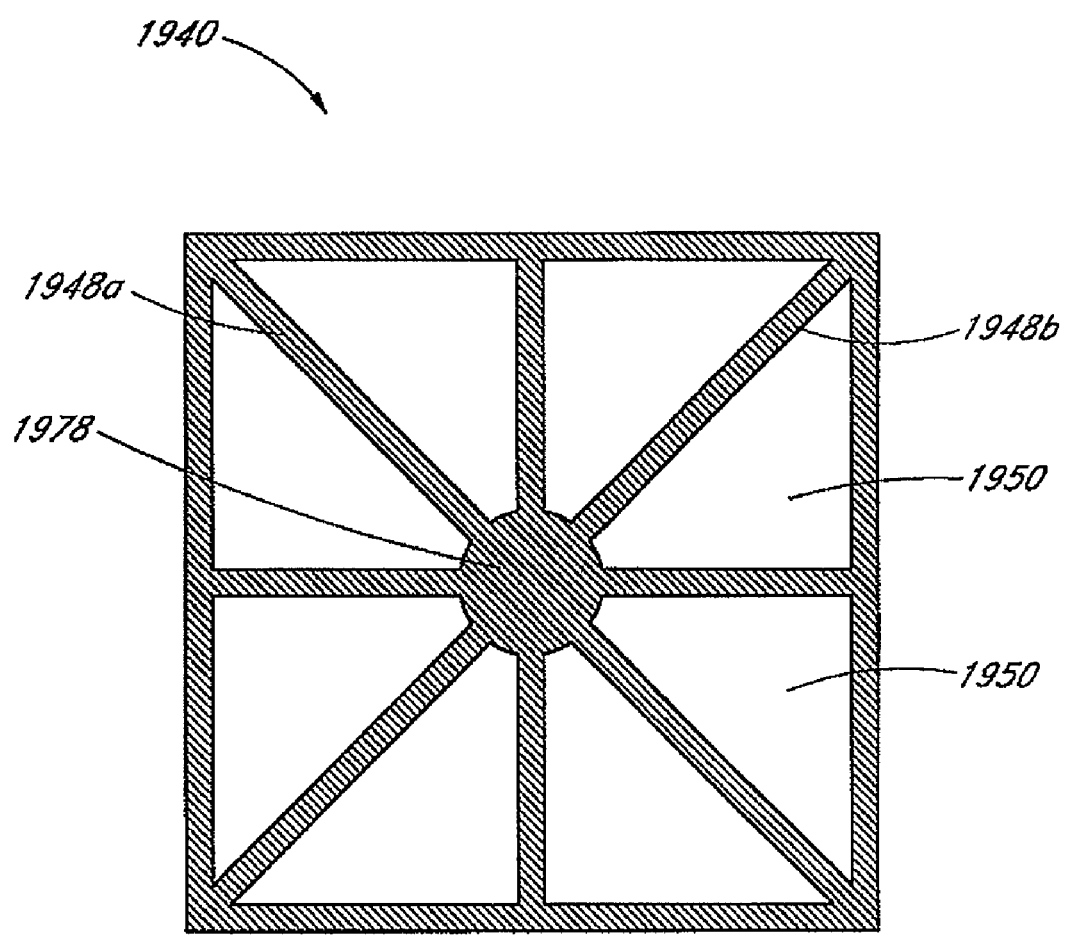
Figure 19E:
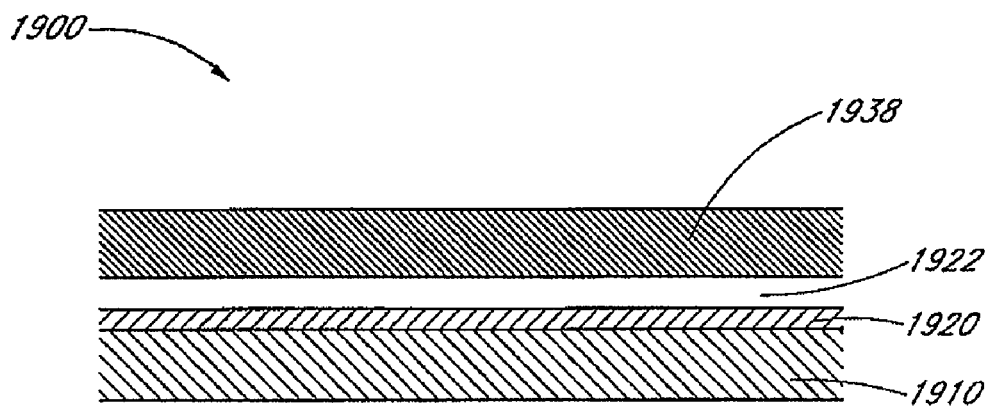
FIG. 19E-FIG. 19G illustrate intermediate structures of some embodiments of a method for fabricating the interferometric modulator illustrated in FIG. 19A.

FIG. 19C is a top view of a preferred embodiment of a movable mirror 1840 in which the structure of the body material 1848 and cavities 1850 form a substantially hexagonal grid with a connector contact area 1878 positioned substantially at the center of the mirror body 1844. Those skilled in the art will understand that other patterns are possible, for example, a rectangular or triangular grid. Some patterns are not substantially regular and/or uniform. For example, in some embodiments, the structure of body material 1848 is configured to provide additional strength wherever it is desired, for example, at or around the center of the mirror body 1844, and/or around one or more edges of the mirror body 1844. An example of such a pattern is a hub-spoke-rim configuration, an embodiment of which is illustrated in FIG. 19D. The movable mirror 1840 comprises a connector contact area 1878 at the hub. The structure of body material is in the form of a rim 1848*a* and spokes 1848*b* extending between the rim 1848*a* and the connector contact area 1858.

Figure 19F:
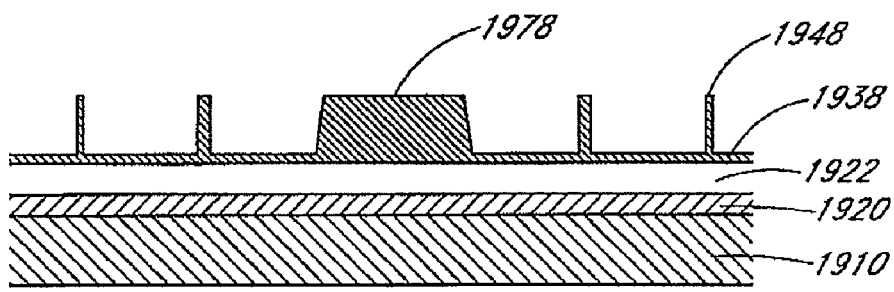
Figure 19G:
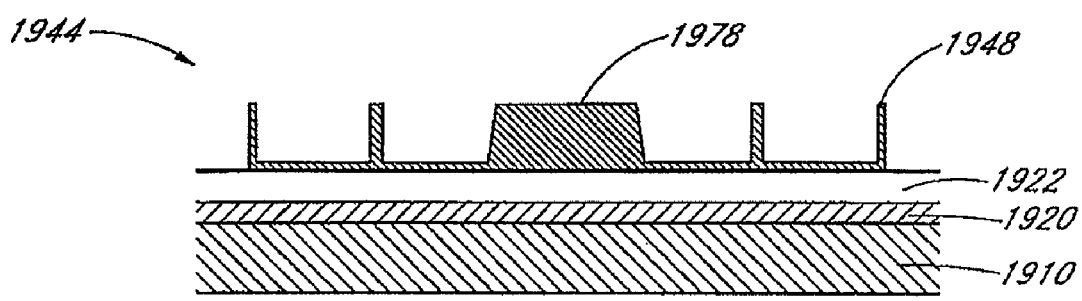
Figure 20:
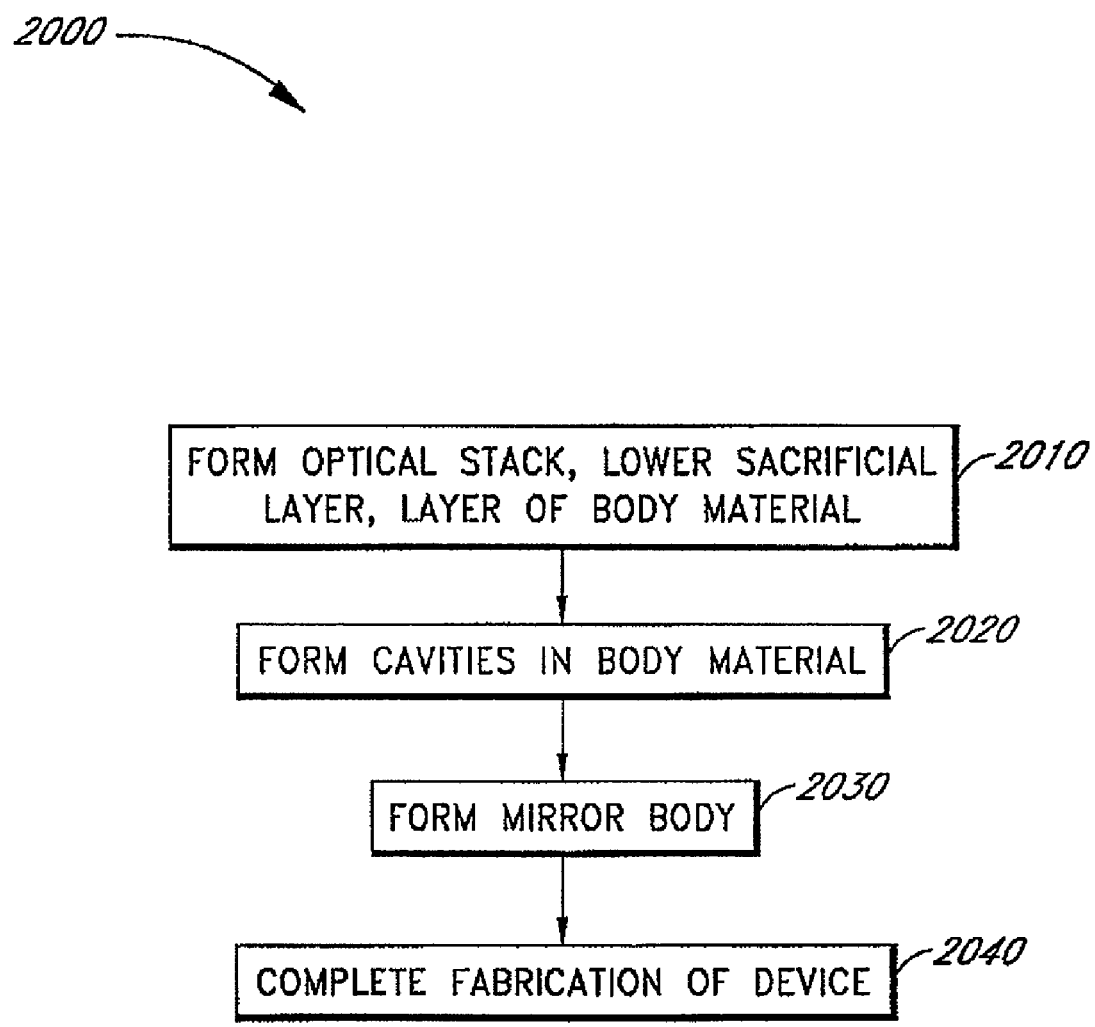
FIG. 20 schematically illustrates an embodiment of a method for fabricating the interferometric modulator illustrated in FIG. 19A.

FIG. 20 schematically illustrates an embodiment 2000 of a method for fabricating the interferometric modulator 1800 with reference to FIG. 19A and FIG. 19E through FIG. 19G. In step 2010, an optical stack 1820, a lower layer of sacrificial material 1822, and a layer of a body material 1838 are formed on a substrate 1810 to provide the structure illustrated in FIG. 19E. In step 2020, the structure 1848 of mirror body material and connector contact area 1878 is formed by masking, patterning, and etching the layer 1838 of body material, thereby forming the cavities 1850. In some embodiments, the etch is a timed etch, which does not etch through the lower portion of the layer 1838. In other embodiments, layer 1838 comprises multiple layers, for example, a lower layer and an upper layer, wherein the upper layer material is preferentially etchable over the lower layer material. In other embodiments, layer 1838 comprises an etch stop formed between an upper layer and a lower layer. The resulting structure is illustrated in FIG. 19F. In step 2030, the mirror body 1844 is formed, for example, by etching, to provide the structure illustrated in FIG. 19G. In step 2040, the fabrication of the interferometric modulator is completed, for example, as described above in steps 970-980.

Those skilled in the art will understand that changes in the apparatus and manufacturing process described above are possible, for example, adding and/or removing components and/or steps, and/or changing their orders. Moreover, the methods, structures, and systems described herein are useful for fabricating other electronic devices, including other types of MEMS devices, for example, other types of optical modulators.

Moreover, while the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method for fabricating a microelectromechanical systems (MEMS) device including a mirror comprising a mirror body, wherein a surface of the mirror body comprises a continuous reflective surface, the method comprising:
   depositing over a lower sacrificial layer the mirror body comprising the reflective surface, wherein
      the mirror body comprises a body material and a sacrificial material, and the sacrificial material is preferentially etchable over the body material;

depositing an upper sacrificial layer over the mirror body;

forming a mechanical layer over the upper sacrificial layer;

removing at least a substantial portion of the sacrificial material from the body;

removing the lower sacrificial layer; and removing the upper sacrificial layer, wherein the MEMS device includes an optical stack with a gap formed between the mirror body and the optical stack, and wherein the mirror body is movable within the gap relative to the optical stack.

2. The method of claim 1, wherein the reflective surface is a surface of a reflective layer.

3. The method of claim 1, wherein the body material comprises aluminum or aluminum alloy, and the sacrificial material comprise molybdenum.

4. The method of claim 1, wherein the body material and sacrificial material form alternating layers substantially parallel to the reflective surface.

5. The method of claim 1, wherein the body material and sacrificial material form a composite, wherein the composite comprises the body material at or above a percolation threshold.

6. The method of claim 5, wherein the composite comprises the sacrificial material at or above a percolation threshold.

7. The method of claim 2, further comprising depositing an etch stop between the layer comprising a reflective surface and the body.

8. The method of claim 1, further comprising forming an opening in the mirror body.

9. The method of claim 1, wherein removing the sacrificial material is performed using xenon difluoride.

10. The method of claim 1, wherein removing at least a portion of the sacrificial material from the body is performed simultaneously with removing the upper sacrificial layer.

11. A method for fabricating a microelectromechanical systems (MEMS) device comprising a mirror body, wherein a surface of the mirror body comprises a continuous reflective surface disposed on a surface of the mirror body, the method comprising:

depositing the mirror body comprising the reflective surface;

etching a cavity in the mirror body;

forming a deformable layer over the mirror body;

securing the mirror body to the deformable layer with a connector; and releasing the mirror body to form a gap on a side of the mirror body opposite the deformable layer, wherein the gap is formed between the mirror body and an optical stack, wherein the deformable layer is capable of supporting the mirror body in a relaxed position and an actuated position.

12. The method of claim 11, wherein the mirror body is aluminum or aluminum alloy.

13. The method of claim 11, wherein the at least one cavity is at least in part defined by one or more structures comprising elements that are substantially perpendicular to the reflective surface.

14. The method of claim 13, wherein the at least one cavity is formed by etching a sacrificial material from mirror body.

15. The method of claim 13, wherein the at least one cavity is formed by etching a body material from mirror body.

16. A method for fabricating a microelectromechanical systems (MEMS) device including a mirror comprising a mirror body, wherein a surface of the mirror body comprises a continuous reflective surface, the method comprising:

forming the mirror body comprising the reflective surface, wherein the mirror body comprises a body material and a sacrificial material, and the sacrificial material is preferentially etchable over the body material; and treating at least a portion of the sacrificial material to convert the portion of the sacrificial material to a solid treated material within the mirror body, wherein the sacrificial material is selectively etchable over the treated material and the body material, wherein the MEMS device includes an optical stack with a gap formed between the mirror body and the optical stack, and wherein the mirror body is movable within the gap relative to the optical stack.

17. The method of claim 16, wherein the body material and sacrificial material form alternating layers that are substantially parallel to the reflective surface, and the treated material is formed around the periphery of the mirror body.

18. The method of claim 16, wherein the treated material is porous such that an etchant is capable of contacting the untreated sacrificial material through pores in the treated material.

19. The method of claim 16, further comprising forming an opening in the mirror body, wherein the opening contacts the sacrificial material.

20. The method of claim 16, further comprising selectively etching the sacrificial material.

21. The method of claim 16, further comprising etching the sacrificial material, wherein the body material and the treated material in the mirror body are not significantly etched.

22. The method of claim 21, wherein the treated material forms spacers within the mirror body.

23. The method of claim 11, wherein the mirror body is positioned more closely adjacent to the optical stack in the actuated position than in the relaxed position.

* * * * *